US012757214B2

(12) United States Patent
Gong et al.

(10) Patent No.: US 12,757,214 B2
(45) Date of Patent: Oct. 6, 2026

(54) DATA TRANSMISSION METHOD AND APPARATUS

(71) Applicant: HUAWEI TECHNOLOGIES CO., LTD., Shenzhen (CN)

(72) Inventors: Bo Gong, Shenzhen (CN); Chenchen Liu, Shenzhen (CN); Mengshi Hu, Shenzhen (CN); Jian Yu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 18/521,920

(22) Filed: Nov. 28, 2023

(65) Prior Publication Data

US 2024/0098753 A1 Mar. 21, 2024

Related U.S. Application Data

(63) Continuation of application No. PCT/CN2022/092312, filed on May 11, 2022.

(30) Foreign Application Priority Data

May 31, 2021 (CN) ......................... 202110604642.2

(51) Int. Cl.
*H04W 72/231* (2023.01)
*H04L 1/00* (2006.01)
*H04W 72/0453* (2023.01)

(52) U.S. Cl.
CPC ......... *H04W 72/231* (2023.01); *H04L 1/0061* (2013.01); *H04W 72/0453* (2013.01)

(58) Field of Classification Search
CPC ........... H04W 72/231; H04W 72/0453; H04W 72/0446; H04L 1/0061; H04L 5/0042;
(Continued)

(56) References Cited

U.S. PATENT DOCUMENTS

2015/0173070 A1* 6/2015 Aboul-Magd .... H04W 74/0816 370/329
2017/0094664 A1* 3/2017 Lee ....................... H04L 5/0028
(Continued)

FOREIGN PATENT DOCUMENTS

CA 3127845 A1 * 8/2020 ............ H04W 72/53
CN 106936749 A 7/2017
(Continued)

OTHER PUBLICATIONS

IEEE P802.11ax/D8.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 1: Enhancements for High Efficiency WLAN, Oct. 2020, total 820 pages.
(Continued)

*Primary Examiner* — Jamal Javaid
(74) *Attorney, Agent, or Firm* — WOMBLE BOND DICKINSON (US) LLP

(57) ABSTRACT

A method comprises: a second communication apparatus sends a trigger frame, to trigger at least one first communication apparatus that includes a first communication apparatus to transmit an uplink PPDU. After receiving the trigger frame, the at least one first communication apparatus sends the PPDU to the second communication apparatus based on the trigger frame. The PPDU includes a data field and an STF sequence, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a
(Continued)

plurality of subcarriers that are consecutive in frequency domain.

20 Claims, 14 Drawing Sheets

(58) Field of Classification Search
CPC ... H04L 5/0044; H04L 5/0048; H04L 5/0041; H04L 5/0007; H04L 5/0091; H04L 5/14; H04L 5/0055
See application file for complete search history.

(56) References Cited

U.S. PATENT DOCUMENTS

| | | | | |
|---|---|---|---|---|
| 2018/0020460 | A1* | 1/2018 | Hedayat | H04L 27/2607 |
| 2019/0380117 | A1 | 12/2019 | Verma et al. | |
| 2020/0008185 | A1 | 1/2020 | Chen et al. | |
| 2020/0014509 | A1 | 1/2020 | Asterjadhi et al. | |
| 2021/0076420 | A1* | 3/2021 | Xin | H04L 49/206 |
| 2021/0143955 | A1 | 5/2021 | Yang et al. | |
| 2022/0007353 | A1* | 1/2022 | Chen | H04L 69/18 |

FOREIGN PATENT DOCUMENTS

| | | | |
|---|---|---|---|
| EP | 3396925 | A2 | 10/2018 |
| EP | 4047855 | A1 | 8/2022 |
| KR | 20200033915 | A | 3/2020 |
| WO | 2020226382 | A1 | 11/2020 |
| WO | 2021091482 | A1 | 5/2021 |
| WO | 2022245463 | A1 | 11/2022 |

OTHER PUBLICATIONS

IEEE P802.11be/D0.3, Draft Standard for Information technology Telecommunications and information exchange between systems Local and metropolitan area networks Specific requirements Part 11: Wireless LAN Medium Access Control (MAC) and Physical Layer (PHY) Specifications Amendment 8: Enhancements for extremely high throughput (EHT), Jan. 2021, total 196 pages.

IEEE Std 802.11ac-2013, IEEE Standard for Information technology Telecommunications and information exchange between systems Local and metropolitan area networks Specific requirements Part 11: Wireless LAN Medium Access Control (MAC) and Physical Layer (PHY) Specifications Amendment 4: Enhancements for Very High Throughput for Operation in Bands below 6 GHz, Dec. 11, 2013, total 425 pages.

IEEE Std 802.11a-1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: High-speed Physical Layer in the 5 GHZ Band, Sep. 16, 1999, total 90 pages.

IEEE Std 802.11b-1999, Supplement to IEEE Standard forInformation technology Telecommunications and information exchange between systems Local and metropolitan area networks Specific requirements Part 11: Wireless LAN Medium Access Control (MAC) and Physical Layer (PHY) specifications: Higher-Speed Physical Layer Extension in the 2.4 GHz Band, Sep. 16, 1999, total 97 pages.

IEEE Std 802.11g-2003, IEEE Standard for Information technology Telecommunications and information exchange between systems Local and metropolitan area networks Specific requirements Part 11: Wireless LAN Medium Access Control (MAC) and Physical Layer (PHY) specifications Amendment 4: Further Higher Data Rate Extension in the 2.4 GHz Band, Jun. 12, 2003, total 77 pages.

IEEE Std 802.11n-2009, IEEE Standard for Information technology Telecommunications and information exchange between systems Local and metropolitan area networks Specific requirements Part 11: Wireless LAN Medium Access Control (MAC) and Physical Layer (PHY) Specifications Amendment 5: Enhancements for Higher Throughput, Sep. 11, 2009, total 536 pages.

IEEE Computer Society, IEEE Std 802.Nov. 2016, IEEE Standard for Information technology-Telecommunications and information exchange between systems Local and metropolitan area networks Specific requirements, Part 11: Wireless LAN Medium Access Control (MAC) and Physical Layer (PHY) Specifications, Published Dec. 14, 2016, total 3534 pages.

Lin Yang et al.,"11ax CSD Design", IEEE 802.11-16/0618r1,May 16, 2016,total 21 pages.

Steve Shellhammer et al.,"Proposed Draft Specification for Trigger frame for EHT", IEEE 802.11-21/0259r3,Mar. 2, 2021,total 43 pages.

Edward Au, "Compendium of straw polls and potential changes to the Specification Framework Document Part 2", IEEE 802.11-20/1935r19, Feb. 27, 2021, total 347 pages.

* cited by examiner

DATA TRANSMISSION METHOD AND APPARATUS

CROSS-REFERENCE TO RELATED APPLICATIONS

This application is a continuation of International Patent Application No. PCT/CN2022/092312, filed on May 11, 2022, which claims priority to Chinese Patent Application No. 202110604642.2, filed on May 31, 2021. The disclosures of the aforementioned applications are hereby incorporated by reference in their entireties.

TECHNICAL FIELD

Embodiments of this application relate to the field of communication technologies, and in particular, to a data transmission method and an apparatus.

BACKGROUND

A concept of a resource unit (RU) is introduced in a wireless local area network (WLAN). A channel bandwidth for data transmission in the WLAN is divided into a plurality of RUs. In other words, a frequency domain resource is allocated by RUs instead of channels. For example, a 20 MHz channel may include a plurality of RUs, which may be a 26-tone RU, a 52-tone RU, or a 106-tone RU. Tone indicates a quantity of subcarriers.

In the WLAN standard protocol, uplink multi-user transmission is an important technology. A main procedure of uplink multi-user transmission is initiated by sending a trigger frame by an access point (AP). The trigger frame carries identifier information and resource allocation information of a station (STA). After receiving the trigger frame, the STA sends an uplink data frame in a corresponding RU by using an extremely high throughput (EHT) trigger based (TB) physical layer protocol data unit (PPDU), and receives, after a short interframe space (SIFS), a block acknowledgment (BA) frame sent by the AP, as shown in FIG. 1. FIG. 2 shows a frame structure of an EHT PPDU by using an uplink data frame sent in WLAN 802.11be as an example. The frame structure of the EHT PPDU includes a legacy short training field (L-STF) field, a legacy long training field (L-LTF) field, a legacy signal field (L-SIG) field, a repeated legacy signal field (RL-SIG) field, a universal signal field (U-SIG) field, an EHT-STF field, a data DATA field, and the like.

In the WLAN standard protocol, maximum transmit power and maximum transmit power spectral density are strictly limited. First, transmit power cannot exceed the maximum power, and transmit power spectral density cannot exceed the maximum power spectral density. Therefore, as a transmit bandwidth increases, how to increase data transmit power and ensure a peak to average power ratio (PAPR) of an STF when a limitation of the maximum power spectral density is met is an urgent problem to be resolved.

SUMMARY

This application provides a data transmission method and an apparatus, to ensure increase of average power of a data part, and ensure a PAPR of an STF, thereby ensuring system performance.

According to a first embodiment, this application provides a data transmission method. The method may be implemented through interaction between a first communication apparatus and a second communication apparatus. The first communication apparatus may be understood as a STA, and the second communication apparatus may be understood as an AP. This is merely an example for description herein, and does not limit types of the first communication apparatus and the second communication apparatus.

The second communication apparatus sends a trigger frame to at least one first communication apparatus. Correspondingly, the first communication apparatus receives the trigger frame sent by the second communication apparatus. The trigger frame is used to trigger at least one first communication apparatus that includes the first communication apparatus to transmit an uplink PPDU. The first communication apparatus sends the PPDU to the second communication apparatus based on the trigger frame. The PPDU includes a data field and an STF sequence, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain.

It should be noted that, in this application, a consecutive RU and a distributed RU are corresponding concepts. A plurality of subcarriers included in one transmission bandwidth may form a plurality of consecutive RUs, or may form a plurality of distributed RUs. In other words, a subcarrier belongs to one consecutive RU in a consecutive RU allocation mechanism, or belongs to one distributed RU in a distributed RU allocation mechanism. A consecutive RU and a distributed RU may include a part of same subcarriers. The consecutive RU is an RU including a plurality of consecutive subcarriers. Alternatively, the consecutive RU is an RU including two consecutive subcarrier groups, where a plurality of subcarriers included in each consecutive subcarrier group are consecutive, and the two subcarrier groups are spaced by only one or more of a guard subcarrier, a null subcarrier, or a direct current subcarrier.

According to a second embodiment, this application further provides a data transmission method. The method may be implemented through interaction between a first communication apparatus and a second communication apparatus. The first communication apparatus may be understood as a STA, and the second communication apparatus may be understood as an AP. This is merely an example for description herein, and does not limit types of the first communication apparatus and the second communication apparatus.

The second communication apparatus sends a trigger frame to at least one first communication apparatus. Correspondingly, the first communication apparatus receives the trigger frame sent by the second communication apparatus. The trigger frame is used to trigger at least one first communication apparatus that includes the first communication apparatus to transmit an uplink PPDU. The first communication apparatus sends the PPDU to the second communication apparatus based on the trigger frame. The PPDU includes a data field and an STF sequence, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers in a first transmission bandwidth, and the first transmission bandwidth is a bandwidth corresponding to the distributed RU that is allocated by the second communication apparatus to the at least one first communication apparatus for transmitting the uplink PPDU.

It should be understood that the first transmission bandwidth may also be understood as a bandwidth allocated by the AP to the uplink PPDU. In a scenario in which all RUs included in the entire transmission bandwidth are distributed RUs, or in a scenario in which a distributed RU is used to allocate a resource to the entire bandwidth, the transmission bandwidth is the entire bandwidth. In a scenario in which the entire bandwidth includes both a distributed RU and a consecutive RU, or in a scenario in which a distributed RU is used to allocate a resource to a part of the entire bandwidth and a consecutive RU is used to allocate a resource to the other part of the bandwidth, the transmission bandwidth is a bandwidth occupied by the distributed RU. For example, it is assumed that the entire bandwidth is 40 MHz. In a scenario in which the distributed RU is used to allocate a resource to the 40 MHz bandwidth, the transmission bandwidth is 40 MHz. In a scenario in which the distributed RU is used to allocate a resource to a 20 MHz bandwidth in the 40 MHz bandwidth and the consecutive RU is used to allocate a resource to the other 20 MHz bandwidth, the transmission bandwidth is 20 MHz. The distributed RU that carries the data field may be one RU, or may be a plurality of RUs. In addition, regardless of which distributed RU or distributed RUs in the first transmission bandwidth is/are the distributed RU that carries the data field, a bandwidth occupied by the distributed RU is the first transmission bandwidth.

According to the data transmission method provided in this application, when the distributed RU is used to carry the data field, the STF sequence is carried on all subcarriers in the first transmission bandwidth or in the consecutive RUs corresponding to the distributed RU, instead of being carried only in the distributed RU. This can ensure increase of average power of a data part sent by the first communication apparatus, and ensure a relatively low PAPR of the first communication apparatus, thereby ensuring system performance.

With reference to the first embodiment and the second embodiment, in some embodiments, there are N first communication apparatuses, N≥1, the trigger frame includes a first field, the first field indicates spatial stream information allocated to the first communication apparatus when the first communication apparatus transmits data by using the distributed RU, and the spatial stream information includes a spatial stream start location and a number of spatial streams, where the spatial stream information of the first communication apparatus is determined by the second communication apparatus based on a total number of spatial streams that are in the transmission bandwidth and that are allocated to the N first communication apparatuses.

It should be noted that, in a conventional technology, because the data field is carried in the consecutive RUs, and the consecutive RUs do not overlap each other, the spatial stream information is the spatial stream start location and the number of spatial streams of the first communication apparatus that are determined after numbers of spatial streams of all users in the consecutive RUs are sorted. However, in this application, the data field is carried in the distributed RU, and consecutive RUs corresponding to distributed RUs of the users may overlap. To avoid mutual interference between STFs of the users in an overlapping area, in this application, the spatial stream start location and the number of spatial streams of the first communication apparatus are determined based on a total number of spatial streams in the transmission bandwidth.

In some embodiments, the STF sequence is obtained through spatial stream information-based cyclic shift.

It should be noted that, during actual application, there may be a plurality of first communication apparatuses, namely, a plurality of STAs, and the plurality of STAs send STF sequences in consecutive RUs corresponding to distributed RUs of the STAs. The consecutive RUs corresponding to the distributed RUs of the STAs may overlap. In this case, phase superposition and phase cancellation may occur in STFs sent by the STAs, that is, there is a relatively large correlation between the STFs sent by the STAs, resulting in inaccurate power measurement. To reduce correlation, the STF sequences sent by the STAs may be considered as STF sequences in different spatial streams. In addition, the spatial streams are numbered. Then, cyclic shift is performed on the STFs based on the numbers of the spatial streams. In this way, correlation between the spatial streams during transmission is reduced, so that accuracy of power measurement is improved.

In some embodiments, the first communication apparatus determines, based on the spatial stream information, F cyclic shift diversity (CSD) values corresponding to F spatial streams of the first communication apparatus, where F≥1; and determines, based on a CSD value corresponding to an $i^{th}$ spatial stream, an STF sequence corresponding to the $i^{th}$ spatial stream, where i is greater than or equal to 1 and less than or equal to F.

It should be noted that the number of spatial streams allocated to the first communication apparatus corresponds to a quantity of CSD values. The STF sequences corresponding to the spatial streams are determined based on the CSD values corresponding to different spatial streams, so that correlation between the spatial streams can be reduced.

In some embodiments, the first field may include a first sub-field and a second sub-field. The first sub-field indicates the spatial stream start location allocated by the second communication apparatus to the first communication apparatus. The second sub-field indicates the number of spatial streams allocated by the second communication apparatus to the first communication apparatus.

In some embodiments, the first sub-field may be a starting spatial stream field in the trigger frame. The second sub-field may be a number of spatial streams field in the trigger frame.

In some embodiments, the first communication apparatus determines a device number of the first communication apparatus based on the trigger frame; determines a non-zero subcarrier index based on the device number; and determines the STF sequence of the first communication apparatus based on the non-zero subcarrier index.

It should be noted that, to avoid mutual interference between the STF sequences sent by the first communication apparatuses when the first communication apparatuses carry data fields by using the distributed RUs, different STF sequences may be determined for non-zero subcarrier indexes of different first communication apparatuses. A non-zero subcarrier may be understood as a subcarrier whose sequence value is not 0 in a consecutive RU corresponding to a distributed RU.

In some embodiments, the device number of the first communication apparatus is determined by calculating receiving time of a (user information list) User Info List field, receiving time of a (user information field) User Info Field field, and a length of the User Info Field field in the trigger frame.

It should be noted that the device number of the first communication apparatus is determined based on the receiving time of the User Info List field, the receiving time of the User Info Field field, and the length of the User Info Field field in the trigger frame without increasing indication overheads.

In an embodiment, Device number of the first communication apparatus=(Receiving time of the User Info Field field−Receiving time of the User Info List field in the trigger frame)/Length of the User Info Field field+1.

In addition, if B55 in a Common Field field in the trigger frame is 0, it indicates that the 1st User Info Field in the User Info List is an extension of the Common Field, which is referred to as whether there is a special user information field Special User Info Field. In this case, Device number N of the first communication apparatus=(Receiving time of the User Info Field field−Receiving time of the User Info List field in the trigger frame)/Length of the User Info Field field. In other words, when B55=0, the Special User Info Field is used as an extension of the Common Field, and one User Info Field is actually not allocated to the user. Therefore, an actual device number N' of the first communication apparatus is the sequence number N of the User Info Field minus 1, that is, N'=N−1. When B55 is equal to 1, the device number N of the first communication apparatus is equal to the sequence number of the User Info Field.

In some embodiments, the number of spatial streams allocated to the first communication apparatus is less than or equal to 8. The first communication apparatus may indicate the device number of the first communication apparatus by using a first bit and a second bit in the trigger frame, where the first bit and the second bit are in a User Info List field in the trigger frame.

It should be noted that, the first bit may be 1 bit in a reserved field of the User Info List field in the trigger frame, and the second bit may be 1 bit in a Starting Spatial Stream field in the User Info List field. If the reserved field indicates the device number of the first communication apparatus, the field is not referred to as a reserved field.

In some embodiments, a periodicity of the STF sequence is 0.8 microseconds (μs), the transmission bandwidth supports the N first communication apparatuses to transmit data, $1<N\leq 4$, an offset value of a non-zero subcarrier index corresponding to a first communication apparatus whose device number is j is a multiple of 16/K, $K=2^l$, $1\leq j\leq N$, and l is 1 or 2.

In some embodiments, N is 4. An offset value of a non-zero subcarrier index corresponding to a first communication apparatus whose device number is 1 is 0; an offset value of a non-zero subcarrier index corresponding to a first communication apparatus whose device number is 2 is 4; an offset value of a non-zero subcarrier index corresponding to a first communication apparatus whose device number is 3 is 8; and an offset value of a non-zero subcarrier index corresponding to a first communication apparatus whose device number is 4 is 12.

In some embodiments, a periodicity of the STF sequence is 1.6 μs, the transmission bandwidth supports the N first communication apparatuses to transmit data, $1<N\leq 4$, an offset value of a non-zero subcarrier index corresponding to a first communication apparatus whose device number is j is a multiple of 8/K, $K=2^l$, $1\leq j\leq N$, and l is 1 or 2.

In some embodiments, N is 4. An offset value of a non-zero subcarrier index corresponding to a first communication apparatus whose device number is 1 is 0; an offset value of a non-zero subcarrier index corresponding to a first communication apparatus whose device number is 2 is 2; an offset value of a non-zero subcarrier index corresponding to a first communication apparatus whose device number is 3 is 4; and an offset value of a non-zero subcarrier index corresponding to a first communication apparatus whose device number is 4 is 6.

In some embodiments, the trigger frame further includes a second field, and the second field indicates whether the first communication apparatus transmits data by using the distributed RU.

In this application, the second field in the trigger frame indicates whether to transmit data by using the distributed RU, to determine, based on the field, how to send the PPDU.

In some embodiments, the second field may be a sub-field in the common information Common Field field in the trigger frame. The sub-field in the Common Field field may be a reserved field in a Common Field field in a trigger frame in the conventional technology, or may be another field. This is not limited in this application.

According to a third embodiment, this application provides a data transmission method. The method may be implemented through interaction between a first communication apparatus and a second communication apparatus. The first communication apparatus may be understood as a STA, and the second communication apparatus may be understood as an AP. This is merely an example for description herein, and does not limit types of the first communication apparatus and the second communication apparatus.

The second communication apparatus sends a trigger frame to at least one first communication apparatus. Correspondingly, the first communication apparatus receives the trigger frame from the second communication apparatus. The trigger frame includes a second field, and the second field indicates whether the first communication apparatus transmits data by using a distributed RU. The first communication apparatus sends a PPDU to the second communication apparatus based on the second field.

In this application, the second field in the trigger frame indicates whether to transmit data by using the distributed RU, to determine, based on the field, how to send the PPDU.

In some embodiments, the second field may be a sub-field in a Common Field field in the trigger frame.

According to a fourth embodiment, this application provides a data transmission apparatus. The apparatus includes a transceiver unit and a processing unit.

The transceiver unit is configured to receive a trigger frame sent by a second communication apparatus, where the trigger frame is used to trigger at least one first communication apparatus that includes the first communication apparatus to transmit an uplink PPDU. The processing unit is configured to send the PPDU to the second communication apparatus based on the trigger frame. The PPDU includes a data field and an STF sequence, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain.

In some embodiments, the trigger frame includes a first field, and the first field indicates spatial stream information allocated to the first communication apparatus when the first communication apparatus transmits data by using the distributed RU. The STF sequence is obtained through spatial stream information-based cyclic shift.

In some embodiments, the spatial stream information includes a spatial stream start location and a number of spatial streams. The spatial stream information of the first communication apparatus is determined by the second communication apparatus based on a total number of spatial streams that are in a transmission bandwidth and that are allocated to the N first communication apparatuses, where N≥1.

In some embodiments, the processing unit is further configured to: determine a device number of the first communication apparatus based on the trigger frame; determine a non-zero subcarrier index based on the device number; and determine the STF sequence of the first communication apparatus based on the non-zero subcarrier index.

In some embodiments, the processing unit is configured to:

determine the device number of the first communication apparatus by calculating receiving time of a User Info List field, receiving time of a User Info Field field, and a length of the User Info Field field in the trigger frame.

In some embodiments, the number of spatial streams allocated to the first communication apparatus is less than or equal to 8, and the processing unit is configured to:

indicate the device number of the first communication apparatus by using a first bit and a second bit in the trigger frame, where the first bit and the second bit are in a User Info List field in the trigger frame.

In some embodiments, a periodicity of the STF sequence is 0.8 μs, the transmission bandwidth supports the N first communication apparatuses to transmit data, 1<N≤4, an offset value of a non-zero subcarrier index corresponding to a first communication apparatus whose device number is j is a multiple of 16/K, $K=2^l$, 1≤j≤N, and l is 1 or 2.

In some embodiments, a periodicity of the STF sequence is 1.6 μs, the transmission bandwidth supports the N first communication apparatuses to transmit data, 1<N≤4, an offset value of a non-zero subcarrier index corresponding to a first communication apparatus whose device number is j is a multiple of 8/K, $K=2^l$, 1≤j≤N, and l is 1 or 2.

In some embodiments, the trigger frame further includes a second field, and the second field indicates whether the first communication apparatus transmits data by using the distributed RU.

In some embodiments, the second field is a sub-field in a Common Field field in the trigger frame.

According to a fifth embodiment, this application provides a data transmission apparatus. The apparatus includes:

a transceiver unit, configured to: send a trigger frame to at least one first communication apparatus, where the trigger frame is used to trigger at least one first communication apparatus that includes the first communication apparatus to transmit an uplink PPDU; and receive the PPDU from the at least one first communication apparatus, where the PPDU includes a data field and a short training field STF sequence that is used for power control, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain; and a processing unit, configured to parse the PPDU.

In some embodiments, there are N first communication apparatuses, N≥1, the trigger frame includes a first field, the first field indicates spatial stream information allocated to the first communication apparatus when the first communication apparatus transmits data by using the distributed RU, and the spatial stream information includes a spatial stream start location and a number of spatial streams, where the spatial stream information of the first communication apparatus is determined by the second communication apparatus based on a total number of spatial streams that are in a transmission bandwidth and that are allocated to the N first communication apparatuses.

In some embodiments, the trigger frame further includes a second field, and the second field indicates whether the first communication apparatus transmits data by using the distributed RU.

In some embodiments, the second field is a sub-field in a Common Field field in the trigger frame.

According to a sixth embodiment, this application provides a data transmission apparatus. The apparatus includes a transceiver unit and a processing unit.

The transceiver unit is configured to receive a trigger frame from a second communication apparatus, where the trigger frame includes a second field, and the second field indicates whether the first communication apparatus transmits data by using a distributed RU. The processing unit is configured to send a PPDU to the second communication apparatus based on the second field.

In some embodiments, the second field may be a sub-field in a Common Field field in the trigger frame.

According to a seventh embodiment, this application provides a communication apparatus. The apparatus includes at least one processor and a memory. The memory is configured to store a computer program or instructions. When the apparatus runs, the at least one processor executes the computer program or the instructions, to enable the communication apparatus to perform the method according to the first embodiment or the method according to the second embodiment.

In some embodiments, there are one or more processors, and there are one or more memories.

In some embodiments, the memory may be integrated with the processor, or the memory and the processor are separately disposed.

In an embodiment, the memory may be a non-transitory memory, for example, a read-only memory (ROM). The memory and the processor may be integrated into one chip, or may be separately disposed in different chips. A type of the memory and a manner in which the memory and the processor are disposed are not limited in this embodiment of this application.

According to an eighth embodiment, this application provides another communication apparatus. The apparatus includes an input circuit, an output circuit, and a processing circuit. The processing circuit is configured to: receive a signal through the input circuit, and transmit a signal through the output circuit, to enable the processor to perform the method according to any one of the first embodiment to the third embodiment or the possible implementations of the first embodiment to the third embodiment.

In an embodiment, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Some implementations of the processor and the various circuits are not limited in this embodiment of this application.

The processing apparatus in the eighth embodiment may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently of the processor.

According to a ninth embodiment, this application further provides a computer-readable storage medium. The computer-readable storage medium stores computer-readable instructions. When the computer-readable instructions are run on a computer, the computer is enabled to perform the method according to any one of the first embodiment or the possible designs of the first embodiment, the method according to any one of the second embodiment or the possible designs of the second embodiment, or the method according to any one of the third embodiment or the possible designs of the third embodiment.

According to a tenth embodiment, this application provides a computer program product including instructions. When the computer program product runs on a computer, the computer is enabled to perform the method according to the first embodiment or the embodiments of the first embodiment, the method according to the second embodiment, or the method according to the third embodiment.

According to an eleventh embodiment, this application provides a chip system. The chip system includes a processor, and may further include a memory, to implement the method according to any one of the first embodiment or the possible designs of the first embodiment, the method according to any one of the second embodiment or the possible designs of the second embodiment, or the method according to any one of the third embodiment or the possible designs of the third embodiment. The chip system may include a chip, or may include a chip and another discrete component.

According to a twelfth embodiment, this application provides a communication system. The system includes a first communication apparatus and a second communication apparatus. The first communication apparatus or the second communication apparatus is configured to perform the method according to any one of the first embodiment or the possible designs of the first embodiment, the method according to any one of the second embodiment or the possible designs of the second embodiment, or the method according to any one of the third embodiment or the possible designs of the third embodiment.

According to a thirteenth embodiment, this application provides a functional entity. The functional entity is configured to implement the method according to any one of the first embodiment to the third embodiment or the possible implementations of the first embodiment to the third embodiment.

For technical effects that can be achieved in the second embodiment to the thirteenth embodiment, refer to descriptions of technical effects that can be achieved in corresponding possible design solutions in the first embodiment. Details are not described herein again in this application.

DESCRIPTION OF EMBODIMENTS

To make objectives, technical solutions, and advantages of this application clearer, the following further describes this application in detail with reference to the accompanying drawings. An operation method in a method embodiment may also be applied to an apparatus embodiment or a system embodiment. In descriptions of this application, unless otherwise specified, “a plurality of” means two or more than two. Therefore, mutual reference may be made to implementation of the apparatus and the method. Repeated parts are not described again.

The technical solutions in embodiments of this application may be applied to various communication systems, such as a WLAN communication system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, and a future 6th generation (6G) system.

For example, the following describes an application scenario in embodiments of this application and a method in embodiments of this application by using only a WLAN system as an example.

Embodiments of this application may be applied to the WLAN system, and may be applied to any protocol in the institute of electrical and electronics engineers (IEEE) 802.11 series protocols used in a WLAN, such as 802.11a/b/g, 802.11n, 802.11ac, 802.11ax, 802.11be, and a future 802.11 protocol. The method provided in this application may be implemented by a communication device in a wireless communication system or a chip or a processor in the communication device. Correspondingly, the communication device supports communication by using the IEEE 802.11 series protocols.

Figure 3:
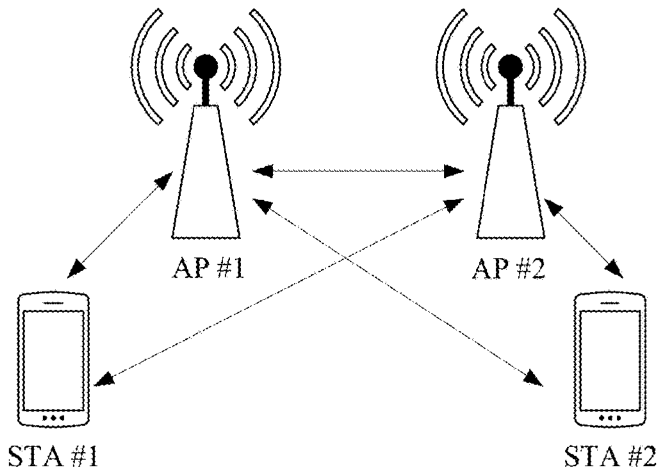
FIG. 3 is a schematic diagram of a communication system according to an embodiment of this application.

For ease of understanding embodiments of this application, a communication system shown in FIG. 3 is first used as an example to describe in detail a communication system applicable to embodiments of this application. In this application, an AP is used as an example of a first communication apparatus for description, and a STA is used as an example of a second communication apparatus for description.

A WLAN system in FIG. 3 may include one or more APs and one or more STAs. In FIG. 3, an example in which the APs are an AP #1 and an AP #2 is used for description, and an example in which the STAs are a STA #1 and a STA #2 is used for description. However, during actual application, quantities of APs and STAs in the communication system are not limited.

The AP may be an access point used by a terminal device (for example, a mobile phone) to access a wired (or wireless) network, and is mainly deployed at home, in a building, and in a park. A typical coverage radius is tens of meters to a hundred meters. Certainly, the access point may alternatively be deployed outdoors. The access point is equivalent to a bridge that connects the wired network and the wireless network. A main function of the access point is to connect various wireless network clients together and then connect the wireless network to the Ethernet. In an embodiment, the AP may be a terminal device (for example, a mobile phone) or a network device (for example, a router) with a wireless fidelity (Wi-Fi) chip. The access point may be a device that supports 802.11be and a next-generation standard of 802.11be. Alternatively, the access point may be a device that supports a plurality of WLAN standards of 802.11 families such as 802.11ax, 802.11ac, 802.11n, 802.11g, 802.11b, and 802.11a.

The access point may include a processor, a transmitter, and a receiver. The processor is configured to control and manage an action of the access point, the transmitter is configured to send information, and the receiver is configured to receive information.

The STA may be a wireless communication chip, a wireless sensor, a wireless communication terminal, or the like, and may also be referred to as user equipment. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. In some embodiments, the station may support 802.11be and a next-generation standard of 802.11be. Alternatively, the station may support a plurality of WLAN standards of 802.11 families such as 802.11ax, 802.11ac, 802.11n, 802.11g, 802.11b, and 802.11a.

The STA may include a processor, a transmitter, and a receiver. The processor is configured to control and manage an action of the access point, the transmitter is configured to send information, and the receiver is configured to receive information.

For example, the AP and the STA may be devices used in the internet of vehicles, internet of things nodes, sensors, or the like in the internet of things (IoT), smart cameras, smart remote controls, or smart water or electricity meters in a smart home, and sensors in a smart city.

It should be noted that the AP may be multi-antenna/multi-radio frequency, or may be single-antenna/single-radio frequency. The antenna/radio frequency is configured to send/receive a data packet. In an embodiment, an antenna or a radio frequency part of the AP may be separated from a main body of the AP, that is, may be remotely disposed. In an embodiment, the STA may be a single antenna/radio frequency, or may be a multi-antenna/multi-radio frequency, and may be a device with more than two antennas. The antenna/radio frequency is configured to send/receive a data packet. In an embodiment, an antenna or a radio frequency part of the STA may be separated from a main body of the STA, that is, may be remotely disposed.

It should be noted that orthogonal frequency division multiple access (OFDMA) may be used for data transmission between the AP and the STA. In an OFDMA transmission scenario, a WLAN protocol divides an entire bandwidth into several RUs, and a PPDU may be transmitted between the AP and the STA by using the allocated RUs. According to the 802.11ax standard, a 20 MHz, 40 MHz, 80 MHz, or 160 MHz bandwidth may be divided into a plurality of types of RUs, and a size of an RU may be a 26-tone RU, a 52-tone RU, a 106-tone RU, a 242-tone RU, a 484-tone RU, a 996-tone RU, or the like. Tone represents a subcarrier. For example, the 26-tone RU represents an RU including 26 consecutive subcarriers, or an RU including a group of 13 consecutive subcarriers and another group of 13 consecutive subcarriers.

In the 802.11be standard, the foregoing resource allocation manner in which the bandwidth is divided into several resource units is used. In the 802.11be standard, locations of some data subcarriers and pilot subcarriers are changed according to the 802.11ax standard. For 20 MHz, 40 MHz, 80 MHz, 160 MHz, or 320 MHz, a spectrum bandwidth may be divided into a plurality of types of RUs, and a size of an RU may be a 26-tone RU, a 52-tone RU, a 106-tone RU, a 242-tone RU, a 484-tone RU, a 996-tone RU, or the like. The 26-tone RU may be allocated to one STA for use. Usually, an RU with a size greater than or equal to 242-tone may be allocated to one or more STAs for use. The RU in the bandwidth includes a data subcarrier and a pilot subcarrier. The data subcarrier is used to carry data information. The pilot subcarrier transmits a fixed value, and is used by a receiving end to estimate a phase and perform phase correction.

802.11be defines different frame structures, and a periodicity of an EHT-STF includes two types: 0.8 μs and 1.6 μs. In addition, five channel bandwidths supported in 802.11be are 20 MHz, 40 MHz, 80 MHz, 160 MHz, and 320 MHz. Each bandwidth and each periodicity correspond to one EHT-STF (for example, a periodicity is 0.8 μs and a channel bandwidth is 20 MHz, which corresponds to one EHT-STF). Therefore, there are a total of 10 (2*5=10) frequency domain values of the EHT-STF.

Figure 4:
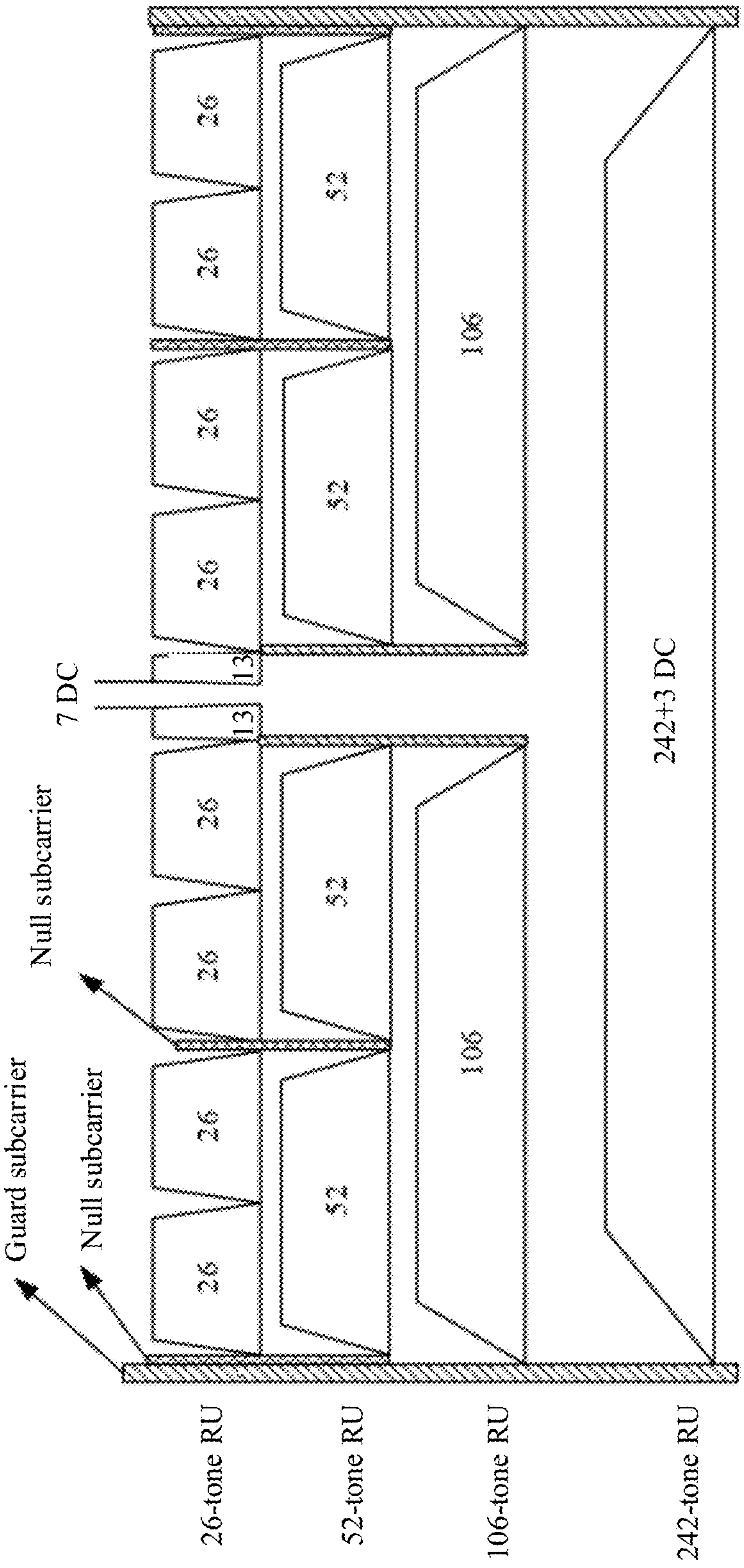
FIG. 4 is a schematic diagram of a possible RU allocation manner when a bandwidth is 20 MHz.

For example, FIG. 4 is a schematic diagram of a possible RU allocation manner when a bandwidth is 20 MHz. The entire 20 MHz bandwidth may include an entire 242-tone RU, or may include any combination of a 26-tone RU, a 52-tone RU, and a 106-tone RU. In addition to the RUs for data transmission, some guard subcarriers, null subcarriers, or direct current (DC) subcarriers are further included. In addition, other bandwidths may correspond to different RU allocation manners. Examples are not listed herein one by one.

In a low power indoor (LPI) communication manner, maximum transmit power and maximum transmit frequency spectrum density are strictly limited. Transmit power of a device is limited by both maximum power and maximum power spectral density. First, transmit power cannot exceed the maximum power, and transmit power spectral density cannot exceed the maximum power spectral density. Because Transmit power of the device=Power spectral density*Transmit bandwidth, when the power spectral density is constant, maximum transmit power of the device increases with increase of the transmit bandwidth. It is known that Average transmit power of each subcarrier=Transmit power/Quantity of valid subcarriers. Therefore, when the power spectral density is constant, to increase the average transmit power of each subcarrier, the transmit power may be increased, and to increase the transmit power, the transmit bandwidth may be increased.

Figure 5:
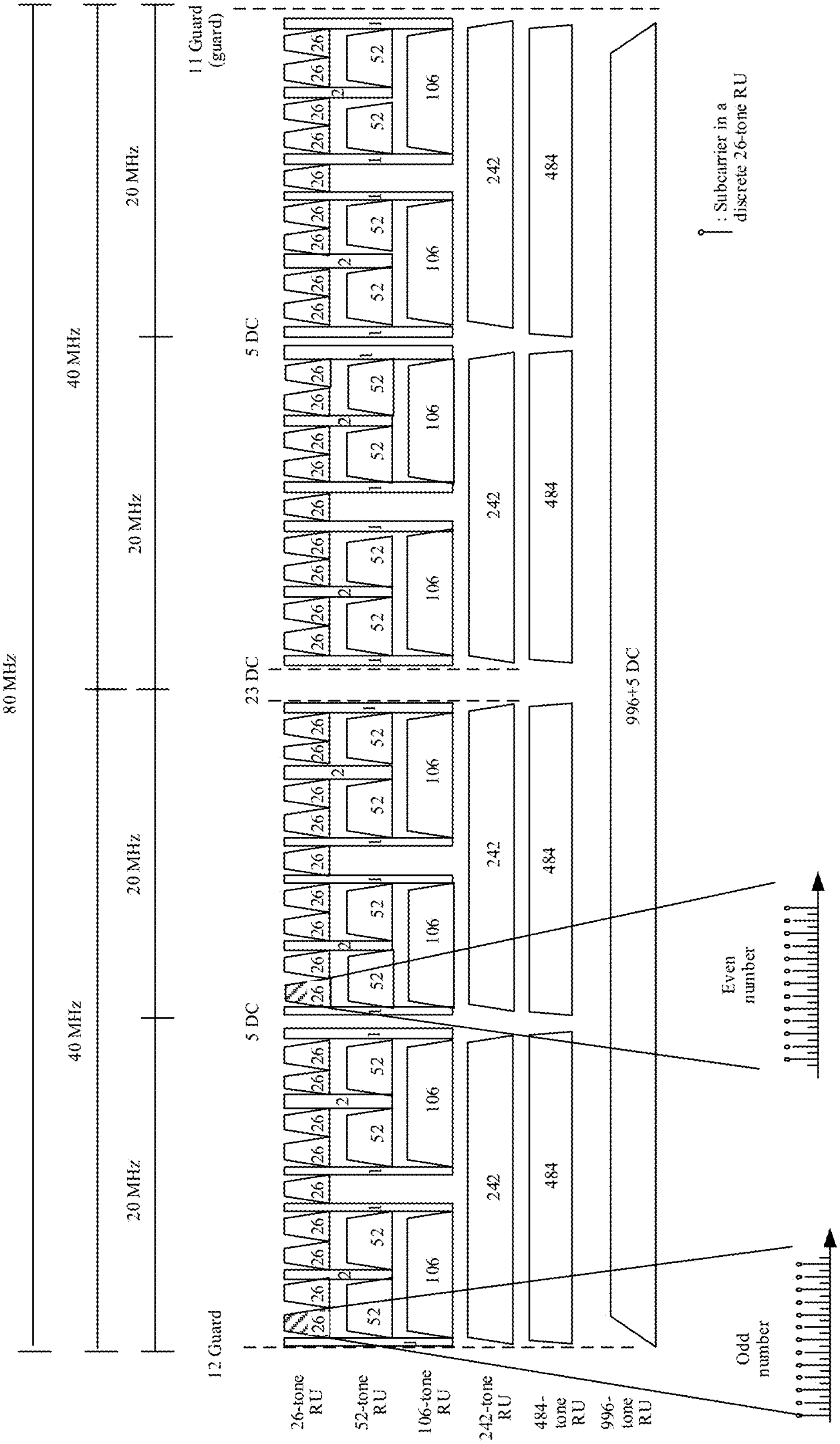
FIG. 5 is a schematic diagram of a distributed RU.

In a manner, subcarriers in one consecutive RU may be discretely distributed to a plurality of consecutive RUs for sending. As shown in FIG. 5, considering a case in which one consecutive 26-tone RU (denoted as a consecutive RU #1) is allocated to a user, subcarriers of the consecutive RU #1 may be discretely distributed to two consecutive 26-tone RUs for sending. For example, 13 subcarriers at odd-numbered locations are selected from the consecutive RU #1, and subcarriers at even-numbered locations are selected from another consecutive 26-tone RU (denoted as a consecutive RU #2). An RU that includes the 13 subcarriers at odd-numbered locations in the consecutive RU #1 and the 13 subcarriers at even-numbered locations in the consecutive RU #2 may be referred to as a distributed RU. It can be learned that, under same power spectral density, a transmit bandwidth of the distributed RU is twice a transmit bandwidth of the consecutive RU, and transmit power is also doubled. However, the quantity of subcarriers is still 26. In this case, the average power of each subcarrier is doubled.

In the foregoing embodiment, after one consecutive RU is allocated to a user, the user transmits data and an STF on all subcarriers of the consecutive RU. Because in the transmission manner, a PAPR of the STF is considered during design of an STF sequence, a PAPR of the STF can be ensured in the transmission manner. However, the subcarriers included in the distributed RU are not consecutive, and are distributed in a wider frequency range. Therefore, when the distributed RU is used to send data, subcarriers in one consecutive RU are discretely distributed to a plurality of consecutive RUs for sending. Under same power spectral density, a transmit bandwidth of the distributed RU is increased compared with a transmit bandwidth of the consecutive RU, and transmit power is also increased. In this case, the average power of each subcarrier is doubled. If the STF sequence is still sent in the consecutive RU before discreteness, power of the distributed RU cannot be accurately measured. If the STF sequence is sent only at a location of the subcarriers of the distributed RU, the PAPR of the STF sequence cannot be ensured.

This application provides a data transmission method, to ensure increase of average power of a data part sent by a first communication apparatus, and ensure a relatively low PAPR of the first communication apparatus.

Figure 6:
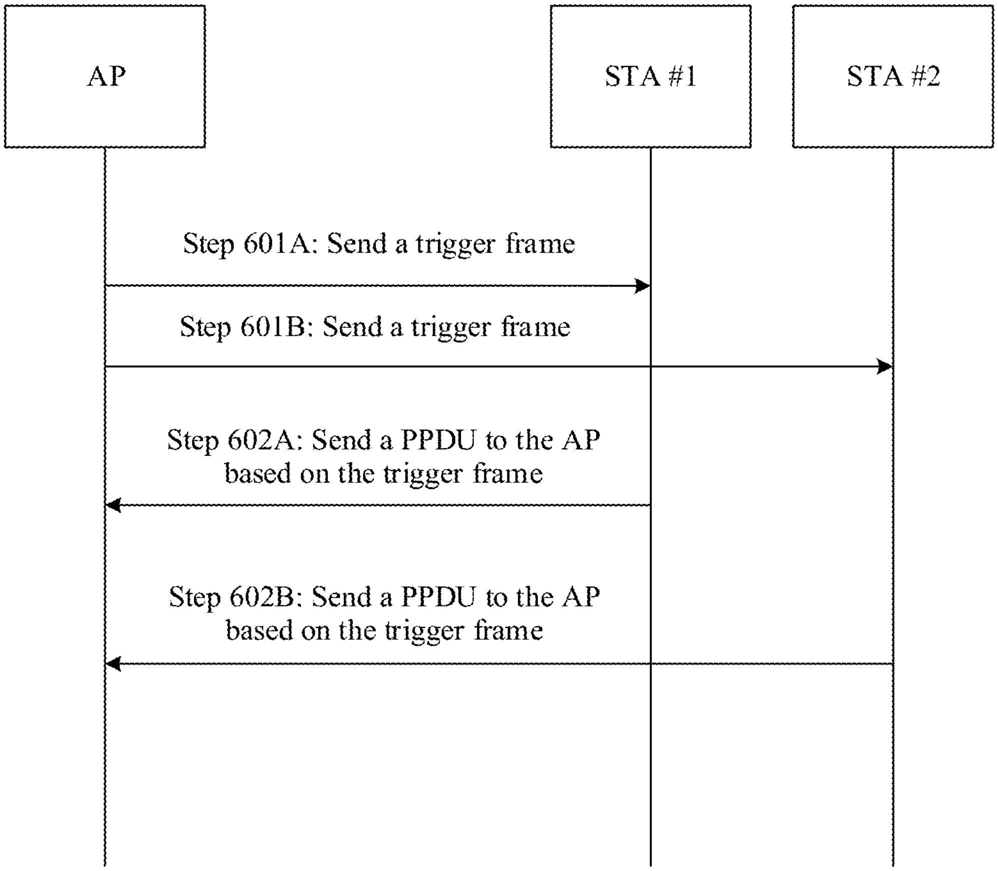
FIG. 6 is a schematic flowchart of a data transmission method according to an embodiment of this application.

FIG. 6 shows a data transmission method according to an embodiment of this application. The method may be implemented through interaction between a first communication apparatus and a second communication apparatus. The first communication apparatus may be understood as a STA, and the second communication apparatus may be understood as an AP. This is merely an example for description herein, and does not limit types of the first communication apparatus and the second communication apparatus. In FIG. 6, an example in which first communication apparatuses are a STA #1 and a STA #2, and a second communication apparatus is an AP is used for description. During actual application, neither of a quantity of first communication apparatuses and a quantity of second communication apparatuses is limited. Reference may be made to the following operations for execution.

Operation 601A: The AP sends a trigger frame to the STA #1.

Operation 601B: The AP sends a trigger frame to the STA #2.

It should be noted that an execution sequence of operation 601A and operation 601B is not limited. Operation 601B may be performed before operation 601A, or operation 601A may be performed before operation 601B, or operation 601A and operation 601B may be performed simultaneously.

In addition, the trigger frames sent by the AP to the STA #1 and the STA #2 are the same. In other words, information carried in the trigger frames is the same, or frame structures of the trigger frames are the same. This is not limited herein in this application. The frame structure of the trigger frame may be a trigger frame, or may be triggered response scheduling (TRS). The TRS mainly includes a control wrapper frame, a quality of service (QoS) data frame, a QoS-null frame, a management frame, and the like.

Figure 7:
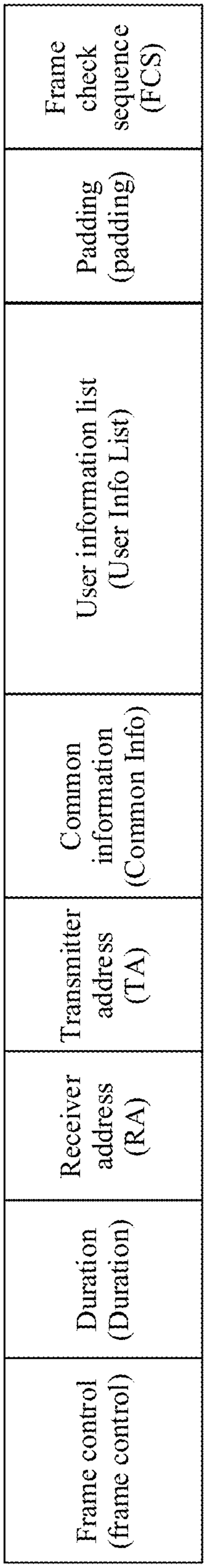
FIG. 7 is a schematic structural diagram of a trigger frame according to an embodiment of this application.

In FIG. 7, an example in which a frame structure of a trigger frame is a trigger frame is used for description. The trigger frame includes a Common Info field and a User Info List field. The common information field includes common information that needs to be read by all STAs. The user information list field includes one or more user information fields. Each user information field includes information that needs to be read by each STA. The trigger frame includes: a 2-bit frame control field, a 2-bit duration field, a 6-bit receiver address (RA) field, a 6-bit transmitter address (TA) field, an 8-bit or more-bit common information (Common Info) field, a user information list (User Info List) field, a padding field, and a 4-bit frame check sequence (FCS) field. The frame control field indicates a frame type. The Duration field indicates frame duration. The RA field indicates a media access control (MAC) address of a receiving STA. The TA field indicates a MAC address of a transmitting STA. The Common Info field indicates common information that needs to be read by all STAs. The User Info List field includes one or more user information fields, and each user information field includes information that needs to be read by each STA. The Padding field is used for zero padding. The FCS field is used for frame check.

The trigger frame is used to trigger at least one first communication apparatus that includes the first communication apparatus to transmit an uplink PPDU. The example in FIG. 6 may be understood as that the trigger frame is used to trigger the STA #1 and the STA #2 to separately send a PPDU to the AP.

Operation 602A: The STA #1 sends the PPDU to the AP based on the trigger frame.

Operation 602B: The STA #2 sends the PPDU to the AP based on the trigger frame.

Figure 1:
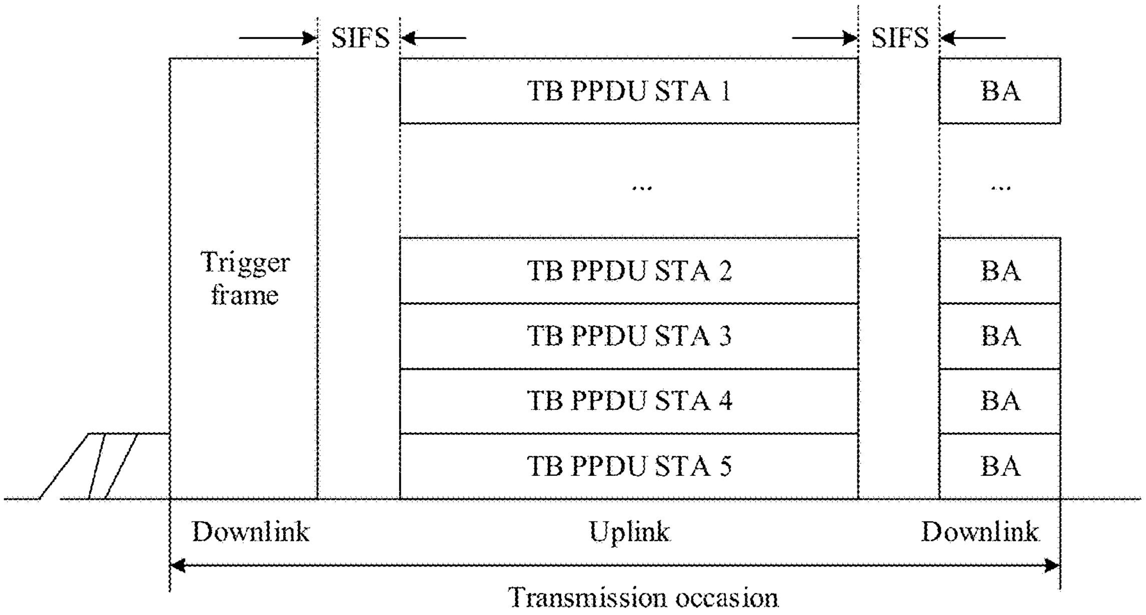
FIG. 1 is a schematic diagram of an uplink multi-user data transmission procedure.
Figure 2:
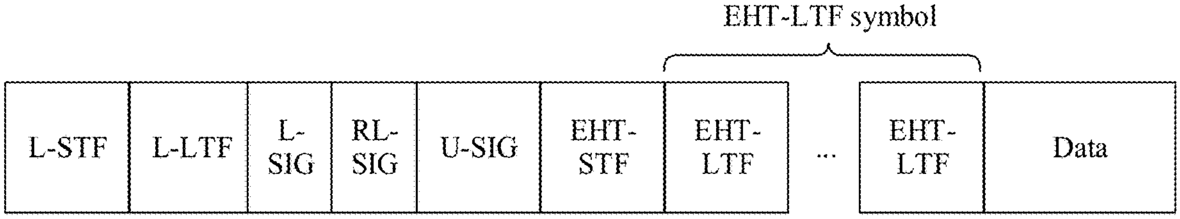
FIG. 2 is a schematic diagram of a frame structure sent by a STA.

As shown in FIG. 2, the PPDU includes a data field and an STF sequence, and names and simple functions of fields (or referred to as fields) of the PPDU are shown in the following Table 1. The Data field is the data field in this application. It should be understood that the PPDU is merely an example, and a format of the PPDU is formulated by a standard. Table 1 merely uses an EHT PPDU in 802.11be as an example for description. However, during actual application, in this application, the trigger frame is not limited to the PPDU in 802.11be, and may alternatively be a PPDU in another WLAN standard. This is not limited in this application.

TABLE 1

| Field in a trigger frame | Function |
|---|---|
| L-STF | Perform PPDU discovery, coarse synchronization, and automatic gain control |
| L-LTF | Perform fine synchronization and channel estimation |
| L-SIG | Carry signaling information related to a PPDU length, to ensure coexistence |
| RL-SIG | Distinguish an HE PPDU from a non-HT, HT, or VHT PPDU |
| U-SIG | Provide information for translating an EHT PPDU |
| EHT-STF | Perform automatic gain control of a subsequent field |
| Data | Carry data information |
| . . . | . . . |

During implementation of the solutions of this application, the data field may be carried in a distributed RU. For example, as shown in FIG. 5, the data field is carried on 13 subcarriers at odd-numbered locations in a consecutive RU #1 and subcarriers at even-numbered locations in a consecutive RU #2. The distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain.

The following describes a consecutive RU, a distributed RU, and a correspondence between a consecutive RU and a distributed RU in this application.

(1) Consecutive RU

The consecutive RU may be understood as an RU including a plurality of consecutive subcarriers. Alternatively, the consecutive RU is an RU including two consecutive subcarrier groups, where a plurality of subcarriers included in each consecutive subcarrier group are consecutive, and the two subcarrier groups are spaced by only one or more of a guard subcarrier, a null subcarrier, or a direct current subcarrier. All RUs supported in 802.11ax may be understood as consecutive RUs. It should be understood that the consecutive RU may alternatively have another name, for example, a regular RU. A name of the consecutive RU is not limited in this application.

It should be understood that the plurality of subcarriers of the consecutive RU may be consecutive; or the consecutive RUs may include two consecutive subcarrier groups, where the two consecutive subcarrier groups are inconsecutive. For example, a 26-tone RU including a group of 13 consecutive subcarriers (such as a subcarrier 1 to a subcarrier 13) and another group of 13 consecutive subcarriers (such as a subcarrier 14 to a subcarrier 26) is a consecutive RU. Similarly, a 996-tone RU including a group of 484 consecutive subcarriers and another group of 484 consecutive subcarriers is a consecutive RU. The RU may also be referred to as a special consecutive RU or a generalized consecutive RU. The consecutive RU in this application alternatively includes a special consecutive RU or a generalized consecutive RU.

In this application, a consecutive RU including K subcarriers is referred to as a consecutive K-tone RU. For example, a consecutive 26-tone RU is a consecutive RU including 26 subcarriers. In other words, a concept of the consecutive K-tone RU is the same as a concept of a K-tone RU in the existing 802.11ax standard.

(2) Distributed RU

The distributed RU includes a plurality of subcarrier groups that are discrete in frequency domain. The distributed RU includes a plurality of subcarrier groups, and any two subcarrier groups are discrete in frequency domain. One subcarrier group includes one subcarrier or includes at least two consecutive subcarriers. In other words, one subcarrier group includes one subcarrier or includes a plurality of consecutive subcarriers.

It should be noted that the distributed RU may also be referred to as a non-consecutive RU, a discrete RU, a separated RU, or the like. In another embodiment, the distributed RU may alternatively have another name. A name of the distributed RU is not limited in this application. An RU that meets a definition of the distributed RU in this application may be considered as the distributed RU in this application. In this application, a quantity of subcarrier groups included in one distributed RU is greater than or equal to 2. In addition, FIG. 5 is merely an example of the distributed RU, and does not constitute a limitation.

In this application, a distributed RU including K subcarriers is referred to as a distributed K-tone RU. For example, a distributed 26-tone RU is a distributed RU including 26 subcarriers. For a value of K, refer to a value of K used for the consecutive RU. Certainly, the value of K may alternatively be different from the value of K used for the consecutive RU. For example, when a bandwidth is 20 MHz, 20 MHz may include one or a combination of a distributed 26-tone RU, a distributed 52-tone RU, a distributed 106-tone RU, and a distributed 242-tone RU.

In this application, one distributed RU and another distributed RU may form a distributed multi-RU, and the distributed multi-RU may be allocated to one or more stations. For example, a distributed 242-tone RU and a distributed 484-tone RU may form a distributed 484+242-tone RU.

It should be noted that the special consecutive RU or the generalized consecutive RU mentioned above do not belong to the distributed RU in this embodiment of this application. For example, in the foregoing example, the 26-tone RU including the group of 13 consecutive subcarriers and the another group of 13 consecutive subcarriers is not the distributed RU defined in this application, but is a special consecutive RU.

In some examples, quantities of subcarriers included in any two of the plurality of subcarrier groups included in the distributed RU may be the same or different. For example, a quantity of subcarriers in each subcarrier group may be 1. For another example, a quantity of subcarriers in a part of the subcarrier groups is 1, and a quantity of subcarriers in other subcarrier groups is 2. One distributed RU may include four subcarrier groups, and quantities of subcarriers in the four subcarrier groups may be sequentially 1 (for example, a subcarrier 3), 1 (for example, a subcarrier 5), 2 (such as a subcarrier 7 and a subcarrier 8), and 2 (such as a subcarrier 10 and a subcarrier 11). This is merely described as an example herein, and is not limited.

In some examples, when a quantity of subcarrier groups included in the distributed RU is greater than or equal to 3, in the plurality of discrete subcarrier groups included in the distributed RU, quantities of subcarriers between every two adjacent subcarrier groups may be the same or different. Every two adjacent subcarrier groups are two adjacent subcarrier groups of one distributed RU.

For example, for a distributed RU including three distributed subcarrier groups (which are respectively a subcarrier group #1, a subcarrier group #2, and a subcarrier group #3), the subcarrier group #1 is adjacent to the subcarrier group #2, and the subcarrier group #2 is adjacent to the subcarrier group #3. In other words, frequencies of subcarriers included in the subcarrier group #1 are less than frequencies of subcarriers included in the subcarrier group #2, and frequencies of subcarriers included in the subcarrier group #2 are less than frequencies of subcarriers included in the subcarrier group #3. In addition, a subcarrier with a highest frequency in the subcarrier group #1 and a subcarrier with a lowest frequency in the subcarrier group #2 are inconsecutive in frequency (or frequency domain). The subcarrier with the highest frequency in the subcarrier group #1 and the subcarrier with the lowest frequency in the subcarrier group #2 are spaced by K1 (K1≥1) subcarriers. In other words, there are K1 subcarriers between the subcarrier with the highest frequency in the subcarrier group #1 and the subcarrier with the lowest frequency in the subcarrier group #2. A subcarrier with a highest frequency in the subcarrier group #2 and a subcarrier with a lowest frequency in the subcarrier group #3 are inconsecutive in frequency (or frequency domain). The subcarrier with the highest frequency in the subcarrier group #2 and the subcarrier with the lowest frequency in the subcarrier group #3 are spaced by K2 (K2≥1) subcarriers. In other words, there are K2 subcarriers between the subcarrier with the highest frequency in the subcarrier group #2 and the subcarrier with the lowest frequency in the subcarrier group #3. K1 may be equal to K2, or may not be equal to K2.

For another example, for a distributed RU including four discrete subcarrier groups (denoted as a subcarrier group #1, a subcarrier group #2, a subcarrier group #3, and a subcarrier group #4), the subcarrier group #1 is adjacent to the subcarrier group #2, the subcarrier group #2 is adjacent to the subcarrier group #3, and the subcarrier group #3 is adjacent to the subcarrier group #4. In addition, a subcarrier with a highest frequency in the subcarrier group #1 and a subcarrier with a lowest frequency in the subcarrier group #2 are spaced by K1 (K1≥1) subcarriers, and a subcarrier with a highest frequency in the subcarrier group #2 and a subcarrier with a lowest frequency in the subcarrier group #3 are spaced by K2 (K2≥1) subcarriers, and a subcarrier with a highest frequency in the subcarrier group #3 and a subcarrier with a lowest frequency in the subcarrier group #4 are spaced by K3 (K3≥1) subcarriers. All of K1, K2, and K3 may be equal, or two of K1, K2, and K3 may be equal, or any two of K1, K2, and K3 are unequal.

Figure 8:
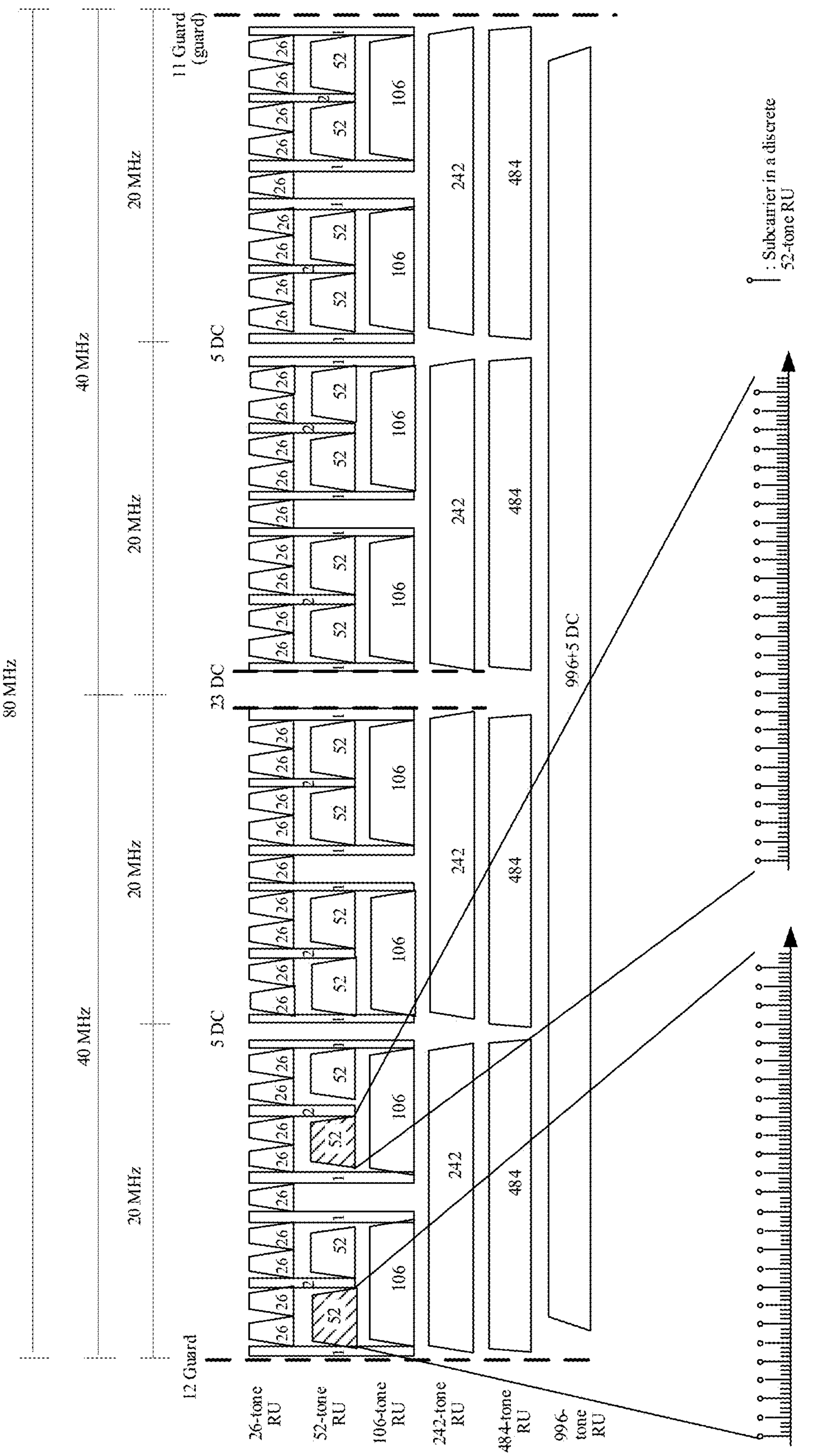
FIG. 8 is a schematic diagram of a distributed RU according to an embodiment of this application.

For example, FIG. 8 is a schematic diagram of a distributed RU. Refer to FIG. 8. A distributed 52-tone RU is distributed in a frequency range of 20 MHz, and the distributed 52-tone RU includes 26 subcarriers in the $1^{st}$ consecutive 52-tone RU and 26 subcarriers in the $3^{rd}$ consecutive 52-tone RU in the $1^{st}$ frequency range of 20 MHz.

Figure 9:
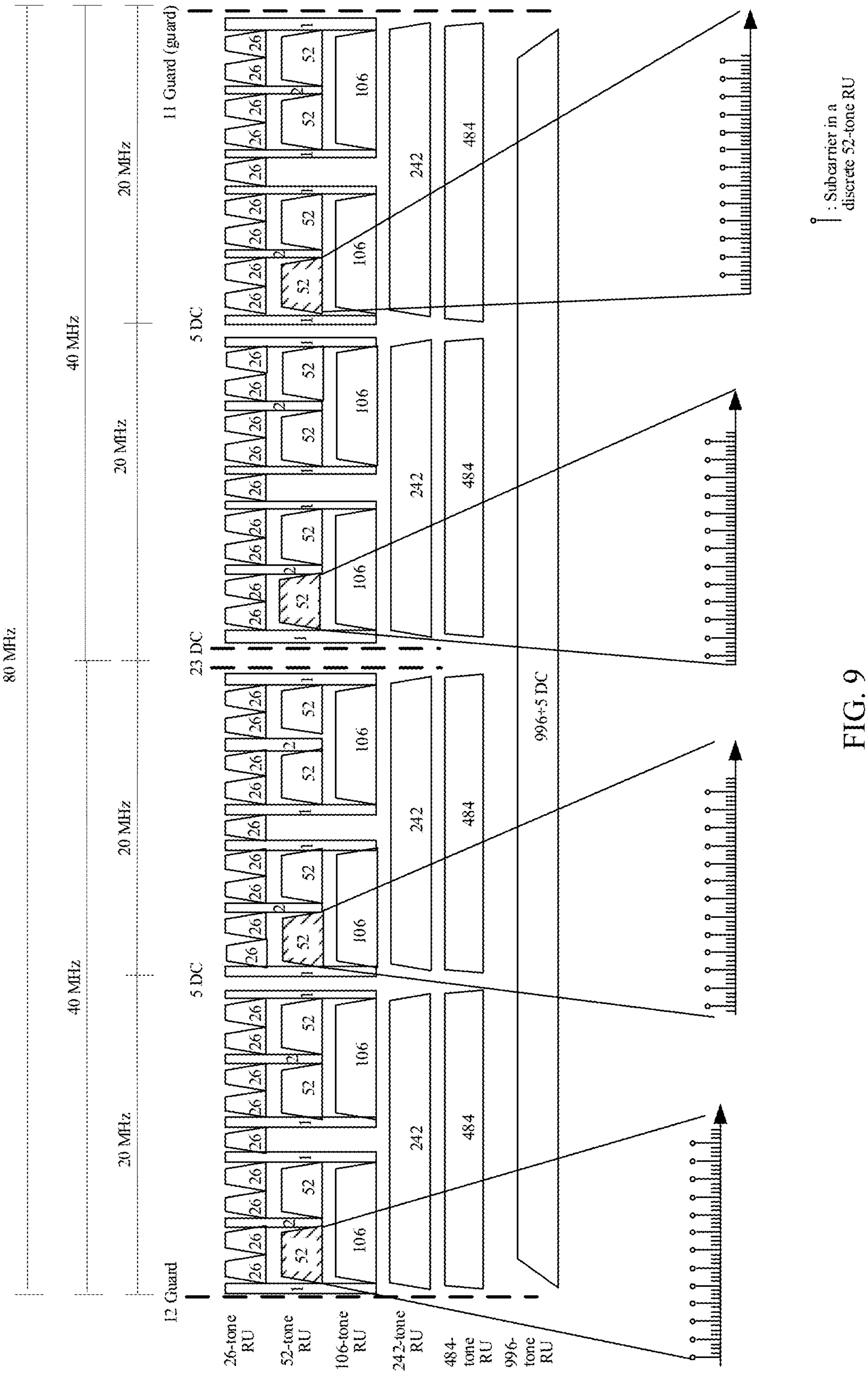
FIG. 9 is a schematic diagram of a distributed RU according to an embodiment of this application.

For example, FIG. 9 is a schematic diagram of a distributed RU. Refer to FIG. 9. A distributed 52-tone RU is distributed in a frequency range of 80 MHz, and the distributed 52-tone RU includes 13 subcarriers in the $1^{st}$ consecutive 52-tone RU in the $1^{st}$ frequency range of 20 MHz, 13 subcarriers in the $1^{st}$ consecutive 52-tone RU in the $2^{nd}$ frequency range of 20 MHz, 13 subcarriers in the $1^{st}$ consecutive 52-tone RU in the $3^{rd}$ frequency range of 20 MHz, and 13 subcarriers in the $1^{st}$ consecutive 52-tone RU in the $4^{th}$ frequency range of 20 MHz.

In some embodiments, the distributed RU includes K subcarriers. A quantity of MHz occupied by the distributed RU is greater than a quantity of MHz occupied by an RU whose quantity of subcarriers is K. A minimum granularity of a quantity of MHz is 1.

The quantity of MHz occupied by the distributed RU is a quantity of MHz occupied by the K subcarriers of the distributed RU. The bandwidth includes a plurality of MHz. At least one subcarrier of the distributed RU is distributed in one MHz. Even if the subcarriers of the distributed RU do not occupy the entire MHz, the MHz is counted in the quantity of MHz occupied by the distributed RU. Refer to FIG. 5. It can be learned that one 26-tone RU in the $1^{st}$ frequency range of 20 MHz includes 26 subcarriers, and a bandwidth occupied by one 26-tone RU is approximately 2 MHz on average (where a 20 MHz bandwidth shown in FIG. 9 includes nine 26-tone RUs). If the distributed RU is used, one 26-tone RU may be distributed to odd-numbered subcarriers of one 26-tone RU and even-numbered subcarriers of another 26-tone RU for sending. In this case, the occupied bandwidth is 2*2 MHz. 2*2 MHz is greater than 2 MHz. However, regardless of whether the distributed 26-tone RU or the consecutive 26-tone RU is used, the quantity of included subcarriers remains unchanged, which is 26.

For example, the 26 subcarriers in the distributed 26-tone RU, including four subcarrier groups. In ascending order of frequencies, the $1^{st}$ to $7^{th}$ subcarriers are consecutive, and belong to one subcarrier group; the $8^{th}$ to $14^{th}$ subcarriers are consecutive, and belong to one subcarrier group; the $15^{th}$ to $20^{th}$ subcarriers are consecutive, and belong to one subcarrier group; and the $21^{st}$ to $26^{th}$ subcarriers are consecutive, and belong to one subcarrier group.

In 1 MHz occupied by the $1^{st}$ to $7^{th}$ subcarriers, only the seven subcarriers are the subcarriers of the distributed 26-tone RU. Even if a frequency corresponding to the $1^{st}$ to $7^{th}$ subcarriers is only 0.5 MHz, that is, the $1^{st}$ to $7^{th}$ subcarriers do not fully occupy the 1 MHz, because a minimum granularity of the quantity of MHz is 1, a quantity of MHz occupied by the $1^{st}$ to $7^{th}$ subcarriers is also 1 MHz.

Similarly, in 1 MHz occupied by the $8^{th}$ to $14^{th}$ subcarriers, only the seven subcarriers are the subcarriers of the distributed 26-tone RU. A quantity of MHz occupied by the $8^{th}$ to $14^{th}$ subcarriers is also 1 MHz. In 1 MHz occupied by the $15^{th}$ to $20^{th}$ subcarriers, only the seven subcarriers are the subcarriers of the distributed 26-tone RU. A quantity of MHz occupied by the $15^{th}$ to $20^{th}$ subcarriers is also 1 MHz. In 1 MHz occupied by the $21^{st}$ to $26^{th}$ subcarriers, only the seven subcarriers are the subcarriers of the distributed 26-tone RU. A quantity of MHz occupied by the $21^{st}$ to $26^{th}$ subcarriers is also 1 MHz. In this way, the quantity of MHz occupied by the distributed 26-tone RU is 4 MHz.

It can be learned from the foregoing descriptions that subcarrier distribution of a consecutive RU is different from that of a distributed RU. For a consecutive RU, there is a fixed correspondence between a quantity of subcarriers and a quantity of MHz occupied by the subcarriers. For example, a quantity of MHz occupied by 26 subcarriers in a consecutive 26-tone RU is 2, a quantity of MHz occupied by 52 subcarriers in a consecutive 52-tone RU is 4, . . . , a quantity of MHz occupied by 242 subcarriers in a consecutive 242-tone RU is 20, a quantity of MHz occupied by a consecutive 484-tone RU is 40, and a quantity of MHz occupied by a consecutive 996-tone RU is 80. However, for a distributed RU, there is no fixed correspondence between a quantity of subcarriers and a quantity of MHz occupied by the subcarriers. For example, 996 subcarriers of a distributed 996-tone RU may be distributed in 160 MHz, or may be distributed in 320 MHz. In other words, a quantity of MHz occupied by 996 subcarriers of a distributed 996-tone RU may be 160 MHz, or may be 320 MHz.

(3) Correspondence Between a Distributed RU and a Consecutive RU

In this application, a plurality of consecutive RUs corresponding to one distributed RU are a plurality of consecutive RUs that include all subcarriers in the distributed RU and that have a minimum total quantity of included subcarriers. Any one of the plurality of consecutive RUs corresponding to the distributed RU includes a part of subcarriers of the distributed RU.

It should be understood that, that one distributed RU corresponds to a plurality of consecutive RUs may be described as that one distributed RU occupies a plurality of consecutive RUs, or one distributed RU is in a plurality of consecutive RUs, or there is a mapping relationship between one distributed RU and a plurality of consecutive RUs, or a plurality of consecutive RUs are consecutive RUs in which one distributed RU is located.

For example, the distributed RU shown in FIG. 5 is used as an example. The $1^{st}$ consecutive 26-tone RU, the $1^{st}$ consecutive 52-tone RU, the $1^{st}$ consecutive 106-tone RU, the $1^{st}$ consecutive 242-tone RU, and the $1^{st}$ consecutive 484-tone RU in the $1^{st}$ 20 MHz shown in FIG. 5 are respectively denoted as a consecutive RU #1, a consecutive RU #2, a consecutive RU #3, a consecutive RU #4, and a consecutive RU #5. The $1^{st}$ consecutive 26-tone RU, the $1^{st}$ consecutive 52-tone RU, the $1^{st}$ consecutive 106-tone RU, the $1^{st}$ consecutive 242-tone RU, and the $1^{st}$ consecutive 484-tone RU in the $2^{nd}$ 20 MHz are respectively denoted as a consecutive RU #6, a consecutive RU #7, a consecutive RU #8, a consecutive RU #9, and a consecutive RU #10. Any one of the consecutive RUs #1 to #5 includes a part of subcarriers of the distributed 26-tone RU shown in FIG. 5, and any one of the consecutive RUs #6 to #10 includes another part of subcarriers of the distributed 26-tone RU. In other words, the plurality of consecutive RUs including all the subcarriers of the distributed RU are any one of the consecutive RUs #1 to #5 and any one of the consecutive RUs #6 to #10. In a combination including one of the consecutive RUs #1 to #5 and one of the consecutive RUs #6 to #10, the consecutive RU #1 and the consecutive RU #6 include a total of 52 subcarriers, and a total quantity of subcarriers included in two consecutive RUs in another combination is greater than 52. In other words, the consecutive RU #1 and the RU #6 are a plurality of consecutive RUs that include all the subcarriers of the distributed RU and that have a minimum total quantity of subcarriers in the plurality of consecutive RUs. Therefore, the plurality of consecutive RUs corresponding to the distributed 26-tone RU are the consecutive RU #1 and the consecutive RU #6.

It should be understood that the AP allocates a bandwidth, namely, a transmission bandwidth, to the uplink PPDU. In a scenario in which all RUs included in the entire transmission bandwidth are distributed RUs, or in a scenario in which a distributed RU is used to allocate a resource to the entire bandwidth, the transmission bandwidth is the entire bandwidth. In a scenario in which the entire bandwidth includes both a distributed RU and a consecutive RU, or in a scenario in which a distributed RU is used to allocate a resource to a part of the entire bandwidth and a consecutive RU is used to allocate a resource to the other part of the bandwidth, the transmission bandwidth is a bandwidth occupied by the distributed RU. For example, it is assumed that the entire bandwidth is 40 MHz. In a scenario in which the distributed RU is used to allocate a resource to the 40 MHz bandwidth, the transmission bandwidth is 40 MHz. In a scenario in which the distributed RU is used to allocate a resource to a 20 MHz bandwidth in the 40 MHz bandwidth and the consecutive RU is used to allocate a resource to the other 20 MHz bandwidth, the transmission bandwidth is 20 MHz. The distributed RU that carries the data field may be one RU, or may be a plurality of RUs. In addition, regardless of which distributed RU or distributed RUs in the transmission bandwidth is/are the distributed RU that carries the data field, a bandwidth occupied by the distributed RU is the transmission bandwidth.

According to the data transmission method provided in this application, when the distributed RU is used to carry the data field, the STF sequence is carried in the transmission bandwidth or in the consecutive RUs corresponding to the distributed RU, instead of being carried only in the distributed RU. This can ensure increase of average power of a data part sent by the first communication apparatus, and ensure a relatively low PAPR of the first communication apparatus, thereby ensuring system performance.

Further, a manner in which the STF sequence is sent when the distributed RU is used to carry the data field in the PPDU may be determined in a plurality of manners, for example, through spatial stream information-based cyclic shift or based on a non-zero subcarrier index. This is not limited herein in this application, and only the spatial stream information-based cyclic shift and the non-zero subcarrier index are used as an example for description. A non-zero subcarrier may also be referred to as a subcarrier whose sequence value is not zero, or may have another name. This is not limited herein in this application.

Example 1: Determine the STF Sequence Through Spatial Stream Information-Based Cyclic Shift The AP may allocate a plurality spatial streams to a STA. When PPDUs are sent, if same STF sequences are used for a plurality of spatial streams, consecutive RUs corresponding to distributed RUs of the STAs may overlap. In this case, phase superposition and phase cancellation may occur in STFs sent by the STAs, that is, there is a relatively large correlation between the STFs sent by the STAs, resulting in inaccurate power measurement. To reduce correlation, the STF sequences sent by the STAs may be considered as STF sequences in different spatial streams. In addition, the spatial streams are numbered. Then, cyclic shift is performed on the STFs based on the numbers of the spatial streams. In this way, correlation between the spatial streams during transmission is reduced, so that accuracy of power measurement is improved.

For example, there may be N STAs, and $N \geq 1$. Spatial stream information of the first communication apparatus is determined by the second communication apparatus based on a total number of spatial streams that are in the transmission bandwidth and that are allocated to the N STAs. The spatial stream information includes a spatial stream start location and a number of spatial streams.

Figure 10A:
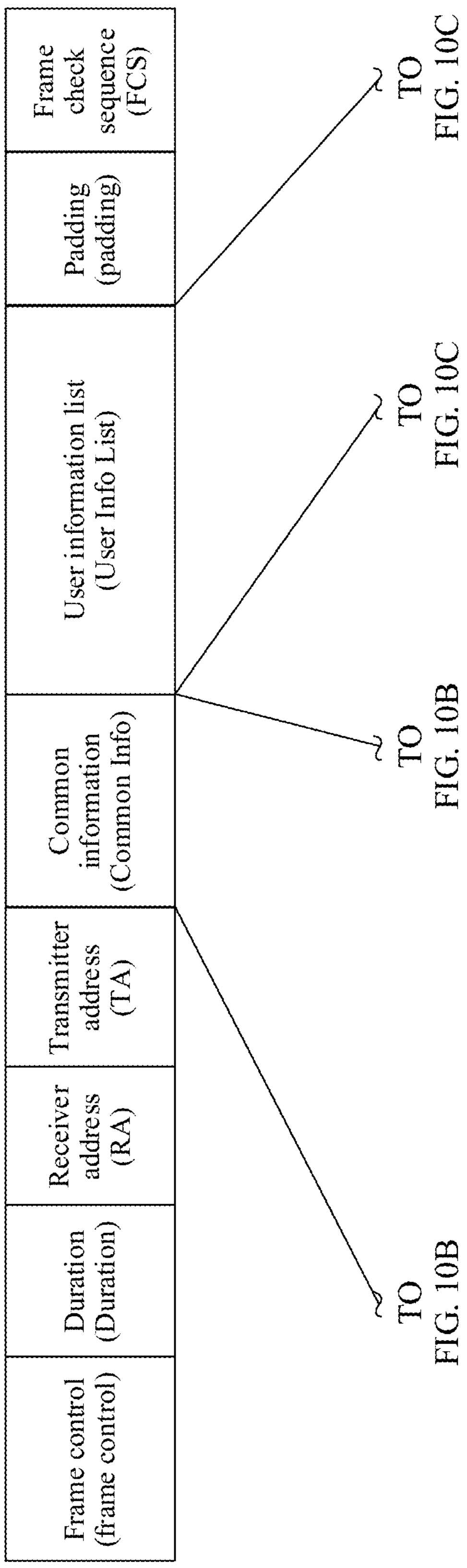
FIG. 10A to FIG. 10C are a schematic structural diagram of a trigger frame according to an embodiment of this application.
Figure 10B:
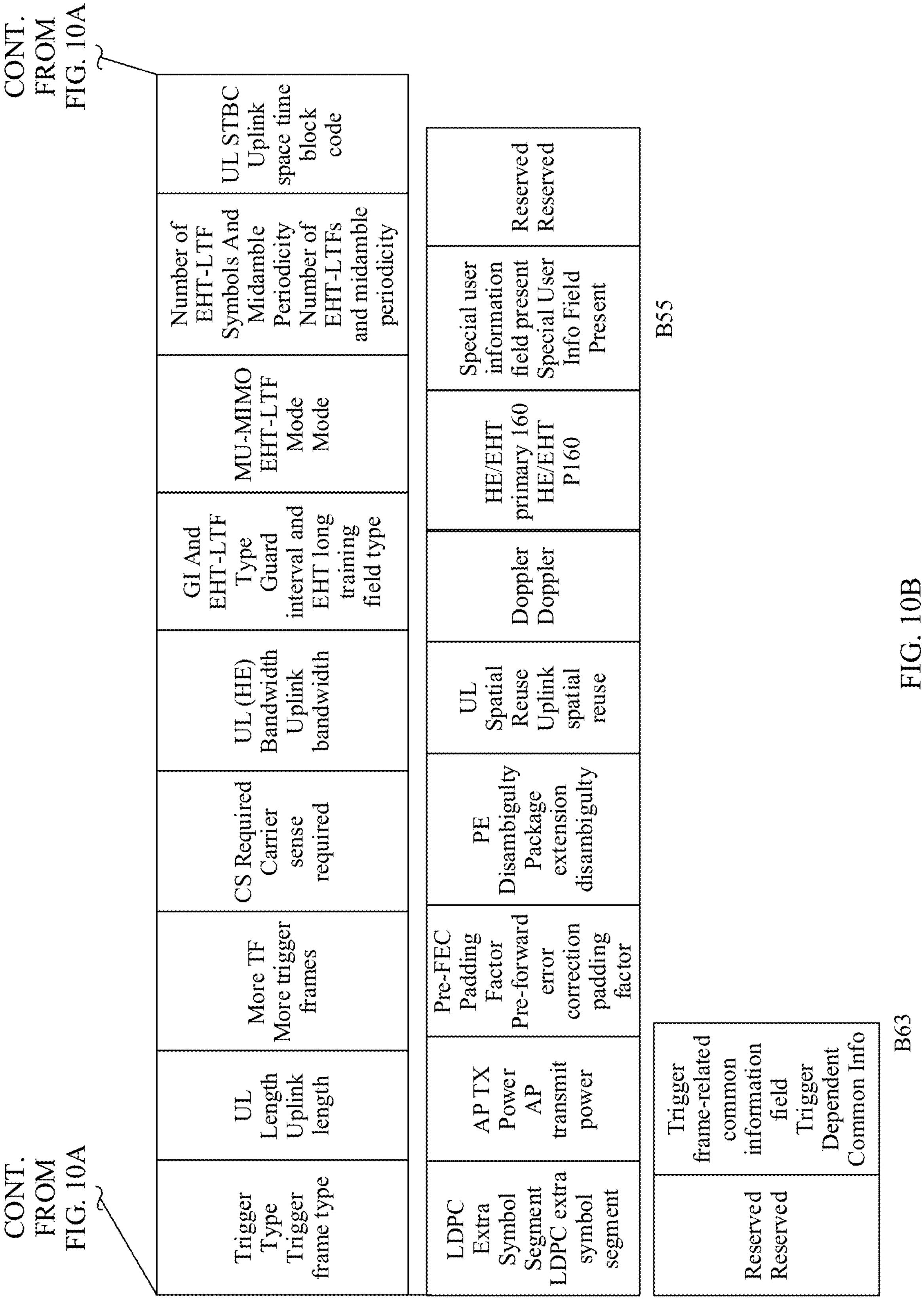
Figure 10C:
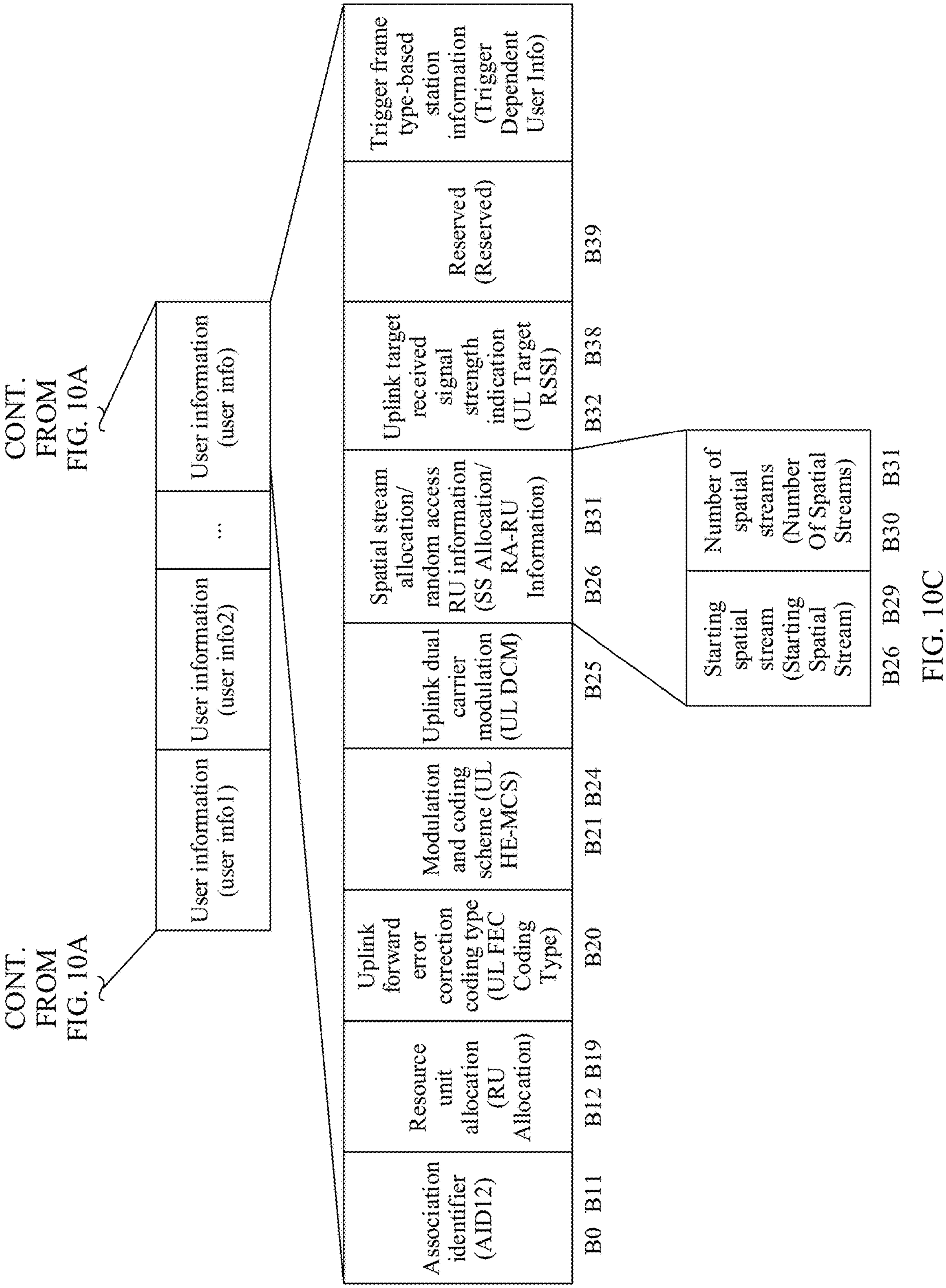

During actual application, the AP may determine, based on a channel measurement result, capability information reported by each STA, and the transmission bandwidth, a spatial stream start location and a number of spatial streams of each STA, and indicate, by using a first field in the trigger frame, spatial stream information allocated to the STA when the STA transmits data by using a distributed RU. The first field may include a first sub-field and a second sub-field. The first sub-field indicates the spatial stream start location allocated by the second communication apparatus to the first communication apparatus. The second sub-field indicates the number of spatial streams allocated by the second communication apparatus to the first communication apparatus. As shown in FIG. 10A to FIG. 10C, the first field may be a spatial stream allocation (SS Allocation) field. The first sub-field may be a starting spatial stream field in the trigger frame. The second sub-field may be a number of spatial streams field in the trigger frame. The Starting Spatial Stream field may indicate a sequence number of a starting stream of the STA. For example, if the Starting Spatial Stream field is 2, it indicates that the starting stream allocated to the STA is the 3$^{rd}$ spatial stream. The Number Of Spatial Streams field may indicate a number of spatial streams allocated to the STA. For example, two spatial streams are allocated to the STA. It can be learned, according to the sequence number of the starting stream of the STA and the number of spatial streams allocated to the STA, that the spatial streams allocated to the STA are a spatial stream 3 and a spatial stream 4.

It should be noted that, in a conventional technology, because a data field is not carried in a distributed RU, but is carried in consecutive RUs, and the consecutive RUs do not overlap each other, spatial stream information is a spatial stream start location of a STA and a number of spatial streams allocated to the STA that are determined after an AP sorts spatial streams of all users in the consecutive RUs (where an RU allocation field may indicate a resource unit in which multiple-input multiple-output (MIMO) occurs). However, in this application, the data field is carried in the distributed RU, and consecutive RUs corresponding to distributed RUs of users may overlap. To avoid mutual interference between STFs of the users in an overlapping area, in this application, the spatial stream start location and the number of spatial streams of the STA are determined based on a total number of spatial streams in the transmission bandwidth (which may be determined by referring to a UL BW field).

The STA determines, based on the spatial stream information, F CSD values corresponding to F spatial streams of the STA, where F≥1; and determines, based on a CSD value corresponding to an i$^{th}$ spatial stream, an STF sequence corresponding to the i$^{th}$ spatial stream, where i is greater than or equal to 1 and less than or equal to F. 802.11n specifies CSD values of the 1$^{st}$ to 4$^{th}$ streams, as shown in Table 2. If two spatial streams are allocated to the STA, the 1$^{st}$ spatial stream is not shifted, and the 2$^{nd}$ spatial stream is cyclically shifted by 400 ns. If three spatial streams are allocated to the STA, the 1$^{st}$ spatial stream is not shifted, the 2$^{nd}$ spatial stream is cyclically shifted by 400 ns, and the 3$^{rd}$ spatial stream is cyclically shifted by 200 ns. If four spatial streams are allocated to the STA, the 1$^{st}$ spatial stream is not shifted, the 2$^{nd}$ spatial stream is cyclically shifted by 400 ns, the 3$^{rd}$ spatial stream is cyclically shifted by 200 ns, and the 4$^{th}$ spatial stream is cyclically shifted by 600 ns.

TABLE 2

| Number of | Shift value on each spatial stream (ns) | | | |
|---|---|---|---|---|
| spatial streams | 1 | 2 | 3 | 4 |
| 1 | 0 | — | — | — |
| 2 | 0 | −400 | — | — |
| 3 | 0 | −400 | −200 | — |
| 4 | 0 | −400 | −200 | −600 |

In addition, 802.11ac/802.11ax specifies CSD values of the 1$^{st}$ to 8$^{th}$ streams, as shown in Table 3. It should be noted that 802.11ac/802.11ax is compatible with design of the CSD values in 802.11n. If eight spatial streams are allocated to the STA, the 1$^{st}$ spatial stream is not shifted, the 2$^{nd}$ spatial stream is cyclically shifted by 400 ns, the 3$^{rd}$ spatial stream is cyclically shifted by 200 ns, the 4$^{th}$ spatial stream is cyclically shifted by 600 ns, the 5$^{th}$ spatial stream is cyclically shifted by 350 ns, the 6$^{th}$ spatial stream is cyclically shifted by 650 ns, the 7$^{th}$ spatial stream is cyclically shifted by 100 ns, and the 8$^{th}$ spatial stream is cyclically shifted by 750 ns.

TABLE 3

| Number of | Shift value on each spatial stream (ns) | | | | | | | |
|---|---|---|---|---|---|---|---|---|
| spatial streams | 1 | 2 | 3 | 4 | 5 | 6 | 7 | 8 |
| 1 | 0 | — | — | — | — | — | — | — |
| 2 | 0 | −400 | — | — | — | — | — | — |
| 3 | 0 | −400 | −200 | — | — | — | — | — |
| 4 | 0 | −400 | −200 | −600 | — | — | — | — |
| 5 | 0 | −400 | −200 | −600 | −350 | — | — | — |
| 6 | 0 | −400 | −200 | −600 | −350 | −650 | — | — |
| 7 | 0 | −400 | −200 | −600 | −350 | −650 | −100 | — |
| 8 | 0 | −400 | −200 | −600 | −350 | −650 | −100 | −750 |

Then, the STA may determine the STF sequence based on the CSD value corresponding to each spatial stream, and transmit the STF sequence in the PPDU.

In the foregoing embodiment, the AP uniformly sorts the numbers of spatial streams of all the users (including OFDMA and MU-MIMO) in the entire bandwidth, and performs CSD selection based on the sorting, so that interference from the STF sequences of the spatial streams caused when the STAs carries data by using the distributed RUs can be avoided. Table 2 and Table 3 are merely examples for description, and do not limit a WLAN standard protocol to which this application is applicable. The foregoing method for determining the STF sequence through spatial stream information-based cyclic shift is not only applicable to 802.11be, but also applicable to a future standard protocol. This is not limited herein in this application.

For STAs whose consecutive RUs corresponding to the distributed RUs overlap, because STF sequences sent by the STAs are the same, meaningless beamforming formed by the STF sequences at the receiving end can be avoided by using different CSD values. The meaningless beamforming refers to a case in which same STF sequences are superposed in a same direction or are reversely canceled. This causes a relatively large fluctuation in a power ratio of the STF to the data part. In this application, the data field is carried in the distributed RU, and the consecutive RUs corresponding to distributed RUs of the users may overlap. CSD cyclic shift is performed on the STF sequences sent in the consecutive RUs corresponding to the distributed RUs, so that mutual interference between the STFs of the users in an overlapping area can be avoided. In addition, in Example 1, the sent STF sequences do not change. In other words, a non-zero subcarrier spacing of the STF sequences does not change. Therefore, PAPRs of the STFs can be ensured, so that system performance can be ensured.

Example 2: Determine the STF Sequence Based on a Non-Zero Subcarrier Index

Figure 11:
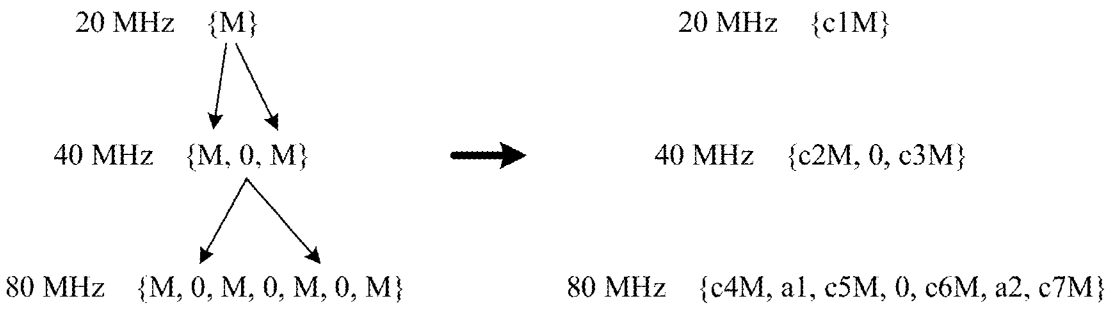
FIG. 11 is a schematic structural diagram of an STF sequence according to an embodiment of this application.

It should be noted that the STF sequence is constructed based on an M sequence through multiplexing, phase rotation, and splicing, as shown in FIG. 11. An optimized value is defined in the 802.11be standard. In an embodiment, a 20 MHz EHT-STF sequence is obtained through splicing after an M sequence is multiplied by a rotation factor c1. A 40 MHz EHT-STF sequence is obtained through splicing after two 20 MHz EHT-STF sequences are multiplied by rotation factors c2 and c3. Similarly, an 80 MHz EHT-STF sequence is obtained through splicing after four 20 MHz EHT-STF sequences are multiplied by rotation factors. In addition, values a1 and a2 need to be inserted between every two M sequences. In addition, a direct current subcarrier in an OFDM modulation mode needs to be 0. The PAPR of the EHT-STF can be minimized by optimizing a and c.

An STF sequence is usually constructed by using an M sequence. Herein, only an EHT-STF sequence is used as an example for description, and a manner of constructing the STF sequence is not limited:

$$EHTS_{-112:16:112}=\{M\}\cdot(1+j)/\sqrt{2};$$

$$EHES_0=0.$$

The M sequence is {−1, −1, −1, 1, 1, 1, −1, 1, 1, 1, −1, 1, 1, −1, 1}. When the transmission bandwidth is 20 MHz, and a periodicity of the EHT-STF sequence is 0.8 μs, there are a total of 256 subcarriers, and subcarrier indexes range from −128 to 127. However, a value is assigned only to subcarrier indexes from −112 to 112 at an interval of 16 operations. For example, corresponding to the foregoing M sequence, when a subcarrier index is −112, a sequence value corresponding to a subcarrier is $-1\cdot(1+j)/\sqrt{2}$; when a subcarrier index is −96, a sequence value corresponding to a subcarrier is $-1\cdot(1+j)/\sqrt{2}$; when a subcarrier index is −80, a sequence value corresponding to a subcarrier is $-1\cdot(1+j)/\sqrt{2}$; when a subcarrier index is −64, a sequence value corresponding to a subcarrier is $1\cdot(1+j)/\sqrt{2}$; when a subcarrier index is −48, a sequence value corresponding to a subcarrier is $1\cdot(1+j)/\sqrt{2}$; when a subcarrier index is −32, a sequence value corresponding to a subcarrier is $1\cdot(1+j)/\sqrt{2}$; when a subcarrier index is −16, a sequence value corresponding to a subcarrier is $-1\cdot(1+j)/\sqrt{2}$; when a subcarrier index is 0, a sequence value corresponding to a subcarrier is 0; when a subcarrier index is 16, a sequence value corresponding to a subcarrier is $1\cdot(1+j)/\sqrt{2}$, and so on. The sequence values corresponding to the subcarriers corresponding to the subcarrier index −96, the subcarrier index −80, and the like are not 0. If none of the sequence values corresponding to the subcarrier −112, the subcarrier −96, the subcarrier −80, the subcarrier −64, the subcarrier −48, the subcarrier −32, the subcarrier −16, the subcarrier 16, the subcarrier 32, the subcarrier 48, the subcarrier 64, the subcarrier 80, the subcarrier 96, and the subcarrier 112 is zero, the subcarriers are non-zero subcarriers. Sequence values corresponding to subcarriers other than the non-zero subcarriers are all 0. For example, the sequence values corresponding to the subcarrier 0 and the subcarrier 128 are both 0. Therefore, it can be learned that the EHT-STF sequence is {0, 14 0 s, 0, $-1\cdot(1+j)/\sqrt{2}$, 15 0 s, $-1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, 0, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 14 0 s, 0}.

In addition, it should be further noted that different transmission bandwidths have different quantities of subcarriers, and correspond to different non-zero subcarrier indexes. For example, if the transmission bandwidth is 40 MHz, and the periodicity of the EHT-STF sequence is 0.8 μs, a value range of the non-zero subcarrier index is −240 to 240; if the transmission bandwidth is 80 MHz, and the periodicity of the EHT-STF sequence is 0.8 μs, a value range of the non-zero subcarrier index is −496 to 496; or if the transmission bandwidth is 160 MHz, and the periodicity of the EHT-STF sequence is 0.8 μs, a value range of the non-zero subcarrier index is −1008 to 1008. In the foregoing non-zero subcarrier indexes, a subcarrier index whose special specified sequence value is 0 (for example, in an example in which the periodicity of the EHT-STF sequence in 20 MHz is 0.8 μs, a sequence value corresponding to a subcarrier whose index is 0 is specified as 0) may not be included in the non-zero subcarrier index, or may be included in the non-zero subcarrier index.

The STA may determine the STF sequence of the STA based on the non-zero subcarrier index, where the non-zero subcarrier index is determined based on a device number, and the device number is determined based on the trigger frame.

Figure 12:
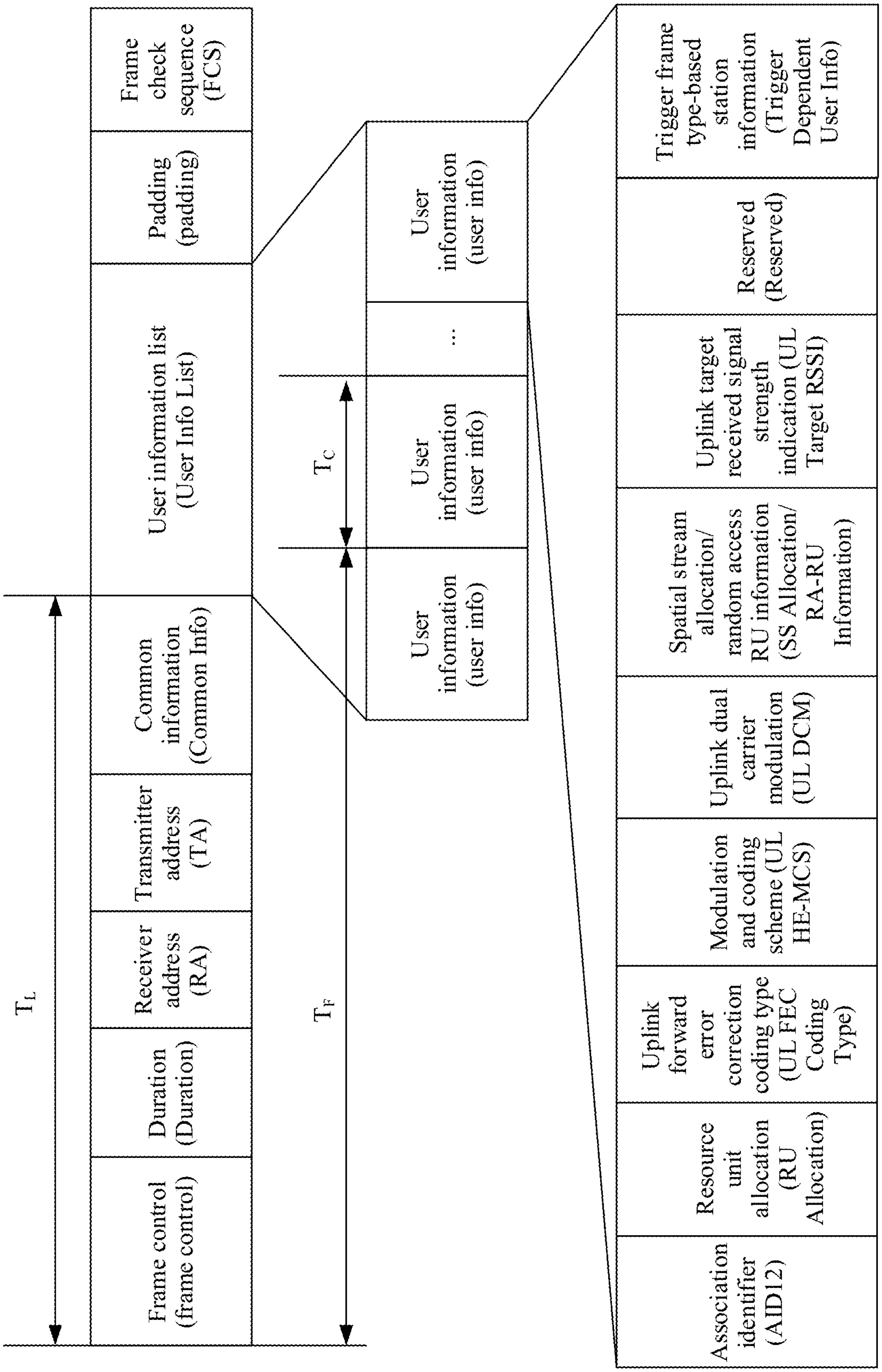
FIG. 12 is a schematic structural diagram of a trigger frame according to an embodiment of this application.

For example, the STA may determine a device number of the first communication apparatus by calculating receiving time of a User Info List field, receiving time of a User Info Field field, and a length of the User Info Field field in the trigger frame. FIG. 12 shows the receiving time TL of the User Info List field, the receiving time TF of the User Info Field field, and the length $T_C$ of the User Info Field field.

During actual application, Device number N of the first communication apparatus=(Receiving time TF of the User Info Field field−Receiving time TL of the User Info List field in the trigger frame)/Length $T_C$ of the User Info Field field+1. In addition, if B55 in a Common Field field in the trigger frame is 0, it indicates that the 1st User Info Field in the User Info List is an extension of the Common Field, which is referred to as a Special User Info Field. In this case, Device number N of the first communication apparatus=(Receiving time of the User Info Field field−Receiving time of the User Info List field in the trigger frame)/Length of the User Info Field field. In other words, when B55=0, the Special User Info Field is used as an extension of the Common Field, and one User Info Field is actually not allocated to the user. Therefore, an actual device number N' of the first communication apparatus is the sequence number N of the User Info Field minus 1, that is, N'=N−1. When B55 is equal to 1, the device number N of the first communication apparatus is equal to the sequence number of the User Info Field.

For example, if the number of spatial streams allocated to the STA is less than or equal to 8, the STA may indicate the device number of the first communication apparatus by using a first bit and a second bit in the trigger frame, where the first bit and the second bit are in the User Info List field in the trigger frame. The first bit may be a bit in a reserved field of the User Info List field in the trigger frame, and the second bit may be one of four bits in a Starting Spatial Stream field in the User Info List field. If the reserved field indicates the device number of the first communication apparatus, the field is not a reserved field.

In some embodiments, the periodicity of the STF sequence is 0.8 μs, the transmission bandwidth supports the N STAs to transmit data, $1<N\leq 4$, an offset value of a non-zero subcarrier index corresponding to a STA whose device number is j is a multiple of 16/K, $K=2^l$, $1\leq j\leq N$, and l is 1 or 2. For example, there are two STAs. If l is 1, an offset value of a non-zero subcarrier index corresponding to a STA whose device number is 1 may be 0 or 8. If the offset value of the non-zero subcarrier index corresponding to the STA whose device number is 1 is 0, an offset value of a non-zero subcarrier index corresponding to a STA whose device number is 2 is 8; or if the offset value of the non-zero subcarrier index corresponding to the STA whose device number is 1 is 8, an offset value of a non-zero subcarrier index corresponding to a STA whose device number is 2 is 0. There are two STAs. If l is 2, an offset value of a non-zero subcarrier index corresponding to a STA whose device number is 1 may be 0, 4, 8, or 12. If the offset value of the non-zero subcarrier index corresponding to the STA whose device number is 1 is 0, an offset value of a non-zero subcarrier index corresponding to a STA whose device number is 2 may be one of 4, 8, and 12; or if the offset value of the non-zero subcarrier index corresponding to the STA whose device number is 1 is 8, an offset value of a non-zero subcarrier index corresponding to a STA whose device number is 2 is one of 0, 4, and 12. This is merely an example for description, and is not illustrated one by one herein. There are three STAs. If l is 2, an offset value of a non-zero subcarrier index corresponding to a STA whose device number is 1 may be 0, 4, 8, or 12. If the offset value of the non-zero subcarrier index corresponding to the STA whose device number is 1 is 0, an offset value of a non-zero subcarrier index corresponding to a STA whose device number is 2 may be one of 4, 8, and 12; or if the offset value of the non-zero subcarrier index corresponding to the STA whose device number is 1 is 4, an offset value of a non-zero subcarrier index corresponding to a STA whose device number is 3 may be 8 or 12. This is merely an example for description, and is not illustrated one by one herein.

If there are four STAs, an offset value of a non-zero subcarrier index corresponding to a STA whose device number is 1 is 0; an offset value of a non-zero subcarrier index corresponding to a STA whose device number is 2 is 4; an offset value of a non-zero subcarrier index corresponding to a STA whose device number is 3 is 8, and an offset value of a non-zero subcarrier index corresponding to a STA whose device number is 4 is 12. The offset value herein may be understood as an offset of a non-zero subcarrier index to the left or to the right. Whether the offset is to the left or to the right is not limited herein, and may be determined according to a protocol agreed on between the AP and the STA during actual application.

Figure 13:
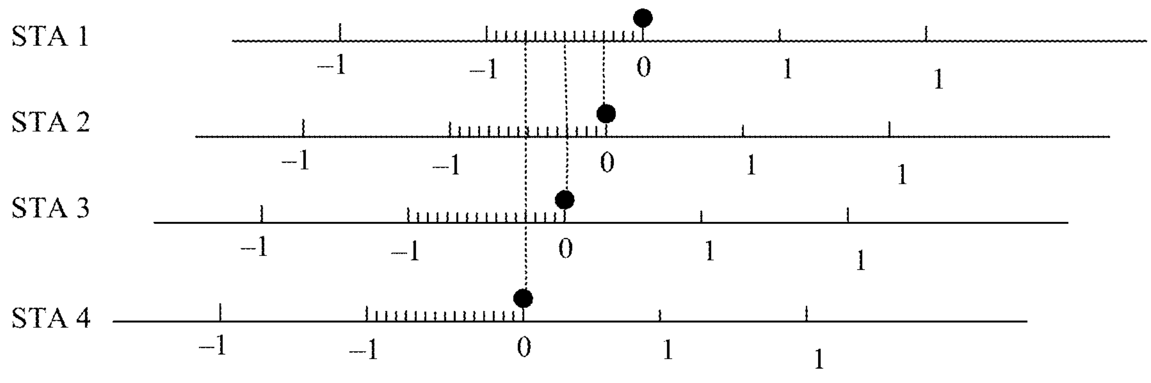
FIG. 13 is a schematic diagram of an offset of a non-zero subcarrier index according to an embodiment of this application.

At the receiving end, a periodicity of a signal received by the AP is 0.8*4=3.2 μs. The transmit end STA needs to send five periodicities, that is, 3.2*5=16 μs. An EHT-STF in a 20M bandwidth is used as an example. STAs 1 to 4 separately send the following sequences. FIG. 13 is a schematic diagram of offset values of non-zero subcarrier indexes of different STAs. The STA 2 is offset to the left by four indexes relative to a value of a non-zero subcarrier index of a STA 1, the STA 3 is offset to the left by eight indexes relative to the value of the non-zero subcarrier index of the STA 1, and the STA 4 is offset to the left by 12 indexes relative to the value of the non-zero subcarrier index of the STA 1. An offset value of the non-zero subcarrier index corresponding to the STA 1 is 0, and a value range of the non-zero subcarrier index is −112 to 112. An offset value of a non-zero subcarrier index corresponding to the STA 2 is −4, and a value range of the non-zero subcarrier index is −116 to 108. An offset value of a non-zero subcarrier index corresponding to the STA 3 is −8, and a value range of the non-zero subcarrier index is −120 to 104. An offset value of a non-zero subcarrier index corresponding to the STA 4 is −12, and a value range of the non-zero subcarrier index is −124 to 100. Details are shown as follows:

STA 1: $EHTS_{-112:16:112}=\{M\}*(1+j)/\sqrt{2}$, $EHTS_0=0$;

STA 2: $EHTS_{-116:16:108}=\{M\}*(1+j)/\sqrt{2}$, $EHTS_{-4}=0$;

STA 3: $EHTS_{-120:16:104}=\{M\}*(1+j)/\sqrt{2}$, $EHTS_{-8}=0$;

STA 4: $EHTS_{-124:16:100}=\{M\}*(1+j)/\sqrt{2}$, $EHTS_{-12}=0$.

It should be noted that the offset of the non-zero subcarrier index may be understood as an overall offset of the EHT-STF sequence, or may be understood as a separate offset of a sequence value corresponding to each subcarrier, and results obtained in both manners are the same. This is not limited herein in this application. In other words, the offset of the non-zero subcarrier index is a possible implementation, and an assigned subcarrier may also be defined. The assigned subcarrier herein may be understood as a subcarrier index that is included in the foregoing non-zero subcarrier indexes and whose special specified sequence value is 0. For example, the transmission bandwidth is 20 MHz, and the periodicity of the EHT-STF sequence is 0.8 μs. The EHT-STF sequence has a total of 256 subcarriers, and subcarrier indexes range from −128 to 127. According to the foregoing process of constructing the EHT-STF sequence, a value is assigned to the subcarrier indexes from −112 to 112 at an interval of 16 operations. When a subcarrier index is 0, a corresponding sequence value is assigned to 0. Therefore, the subcarrier indexes may be from −112 to 112. A subcarrier index with an interval operation of 16 is considered as an assigned subcarrier index. Simply speaking, compared with a non-zero subcarrier index, an assigned subcarrier index has an additional subcarrier index that is specially specified as 0 (where a corresponding subcarrier index in the foregoing example is 0). When the offset of the subcarrier index described in this embodiment of this application is performed, the assigned subcarrier may also be considered as a whole for offset.

As described above, the EHT-STF sequence sent by the STA 1 is not offset, which is {0, 14 0 s, 0, $-1\cdot(1+j)/\sqrt{2}$, 15 0 s, $-1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, 0, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 14 0 s, 0}; the EHT-STF sequence sent by the STA 2 is offset by −4, which is {0, 10 0 s, 0, $-1\cdot(1+j)/\sqrt{2}$, 15 0 s, $-1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, 0, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 18 0 s, 0}; the EHT-STF sequence sent by the STA 3 is offset by −8, which is {0, 6 0 s, 0, $-1\cdot(1+j)/\sqrt{2}$, 15 0 s, $-1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $(1+j)/\sqrt{2}$, 15 0 s, $-1\cdot(1+j)/\sqrt{2}$, 15 0 s, 0, 15 0 s, $1\cdot(1+j)/\sqrt{2}$, 15 0 s, $(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 22 0 s, 0}; and the EHT-STF sequence sent by the STA 4 is offset by −12, which is {0, 2 0 s, 0, $-1\cdot(1+j)/\sqrt{2}$, 15 0 s, $-1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, 0, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 15 0 s, $1\cdot(1+j)/\sqrt{2}$, 15 0 s, $-1\cdot(1+j)/\sqrt{2}$, 15 0 s, $1\cdot(1+j)/\sqrt{2}$, 26 0 s, 0}.

In some embodiments, the periodicity of the STF sequence is 1.6 μs, the transmission bandwidth supports the N first communication apparatuses to transmit data, $1<N\leq 4$, an offset value of a non-zero subcarrier index corresponding to a first communication apparatus whose device number is j is a multiple of 8/K, $K=2^l$, $1\leq j\leq N$, and l is 1 or 2.

If there are four STAs, an offset value of a non-zero subcarrier index corresponding to a STA whose device number is 1 is 0; an offset value of a non-zero subcarrier index corresponding to a STA whose device number is 2 is 2; an offset value of a non-zero subcarrier index corresponding to a STA whose device number is 3 is 4, and an offset value of a non-zero subcarrier index corresponding to a STA whose device number is 4 is 6. The offset value herein may be understood as an offset of a non-zero subcarrier index to the left or to the right. Whether the offset is to the left or to the right is not limited herein, and may be determined according to a protocol agreed on between the AP and the STA during actual application.

In Example 2, when the distributed RU is used for the data part in the PPDU, the distributed RUs corresponding to the STAs are allowed to overlap. In this case, for an overlapping RU part, the STFs sent by the STAs are the same, and meaningless beamforming may be formed, resulting in an inaccurate AGC gain. In Example 2, the non-zero subcarrier index is offset, so that the EHT-STFs of the users do not overlap each other. This avoids meaningless beamforming of the EHT-STFs.

In addition, it should be further noted that, in the foregoing Example 1 or 2, the trigger frame further includes a second field, and the second field may indicate whether the first communication apparatus transmits data by using the distributed RU. During actual application, the second field may be the reserved field in the Common Field field in the trigger frame shown in FIG. 10A to FIG. 10C, namely, any bit in B56 to B63. For example, B63 is used for indication. If a value corresponding to the field B63 is 1, it is determined that the STA needs to transmit data by using the distributed RU; or if a value corresponding to the field B63 is 0, it is determined that the STA does not need to transmit data by using the distributed RU. A manner in which the STA transmits data by using the distributed RU is not limited in this application.

It should be noted that the AP may indicate, by using the second field, whether each STA transmits data by using the distributed RU, and may perform indication according to Table 4. For example, if the second field is 1, it indicates that the STA #1 transmits data by using the distributed RU and the STA #2 transmits data by using the distributed RU. If the second field is 0, it indicates that the STA #1 does not transmit data by using the distributed RU and the STA #2 does not transmit data by using the distributed RU. Alternatively, if the second field is 0, it indicates that the STA #1 transmits data by using the distributed RU and the STA #2 transmits data by using the distributed RU. If the second field is 1, it indicates that the STA #1 does not transmit data by using the distributed RU and the STA #2 does not transmit data by using the distributed RU. This is not limited in this application.

TABLE 4

| Bit value of a second field | Whether to transmit data by using a distributed RU: STA #1 | STA #2 |
|---|---|---|
| 1 | Yes | Yes |
| 0 | No | No |

When the STA transmits data by using the distributed RU, reference may be made to the foregoing Example 1 or Example 2 to determine how to send the STF sequence in the PPDU. Details are not described herein again. During actual application, the second field may be any bit in sub-fields such as B56 to B63 in the Common Field field in the trigger frame shown in FIG. 10A to FIG. 10C, or may be another sub-field. This is not limited herein in this application. For example, B63 is used for indication. If a value corresponding to the field B63 is 1, it is determined that the STA needs to transmit data by using the distributed RU; or if a value corresponding to the field B63 is 0, it is determined that the STA does not need to transmit data by using the distributed RU. A manner in which the STA transmits data by using the distributed RU is not limited in this application.

It should be uniformly noted that, in this application, the EHT-STF sequence is used as an example to describe embodiments of this application. However, this is not limited. The 802.11be standard is used as a boundary. The method provided in this application may be applied to a standard before 802.11be, or may be applied to a standard after 802.11be, namely, a next-generation 802.11 standard.

Figure 14:
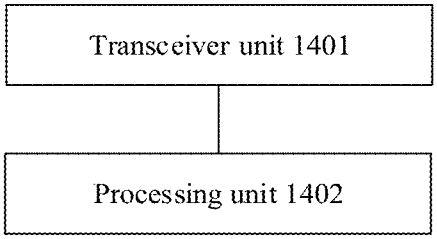
FIG. 14 is a schematic structural diagram of a data transmission apparatus according to an embodiment of this application.

As shown in FIG. 14, a data transmission apparatus provided in this application includes a transceiver unit 1401 and a processing unit 1402.

The data transmission apparatus may be understood as a first communication apparatus, or may be understood as a second communication apparatus. When the data transmission apparatus is the first communication apparatus, the transceiver unit 1401 is configured to receive a trigger frame sent by a second communication apparatus, where the trigger frame is used to trigger at least one first communication apparatus that includes the first communication apparatus to transmit an uplink PPDU; and the processing unit 1402 is configured to send the PPDU to the second communication apparatus based on the trigger frame, where the PPDU includes a data field and an STF sequence, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain.

When the data transmission apparatus is the second communication apparatus, the transceiver unit 1401 is configured to: send a trigger frame to at least one first communication apparatus, where the trigger frame is used to trigger at least one first communication apparatus that includes the first communication apparatus to transmit an uplink PPDU; and receive the PPDU from the at least one first communication apparatus, where the PPDU includes a data field and a short training field STF sequence that is used for power control, the data field is carried in a distributed RU, the distributed RU includes a plurality of subcarrier groups that are discrete in frequency domain, one of the subcarrier groups includes one subcarrier or includes at least two consecutive subcarriers, the STF sequence is carried on all subcarriers of a plurality of consecutive RUs, the plurality of consecutive RUs are consecutive RUs corresponding to the distributed RU, and each of the consecutive RUs includes a plurality of subcarriers that are consecutive in frequency domain.

It should be noted that, in this application, a consecutive RU and a distributed RU are corresponding concepts. A plurality of subcarriers included in one bandwidth may form a plurality of consecutive RUs, or may form a plurality of distributed RUs. In other words, a subcarrier belongs to one consecutive RU in a consecutive RU allocation mechanism, or belongs to one distributed RU in a distributed RU allocation mechanism. A consecutive RU and a distributed RU may include a part of same subcarriers. The consecutive RU is an RU including a plurality of consecutive subcarriers. Alternatively, the consecutive RU is an RU including two consecutive subcarrier groups, where a plurality of subcarriers included in each consecutive subcarrier group are consecutive, and the two subcarrier groups are spaced by only one or more of a guard subcarrier, a null subcarrier, or a direct current subcarrier.

It should be understood that the transmission bandwidth may also be understood as a bandwidth allocated by the AP to the uplink PPDU. In a scenario in which all RUs included in the entire transmission bandwidth are distributed RUs, or in a scenario in which a distributed RU is used to allocate a resource to the entire bandwidth, the transmission bandwidth is the entire bandwidth. In a scenario in which the entire bandwidth includes both a distributed RU and a consecutive RU, or in a scenario in which a distributed RU is used to allocate a resource to a part of the entire bandwidth and a consecutive RU is used to allocate a resource to the other part of the bandwidth, the transmission bandwidth is a bandwidth occupied by the distributed RU. For example, it is assumed that the entire bandwidth is 40 MHz. In a scenario in which the distributed RU is used to allocate a resource to the 40 MHz bandwidth, the transmission bandwidth is 40 MHz. In a scenario in which the distributed RU is used to allocate a resource to a 20 MHz bandwidth in the 40 MHz bandwidth and the consecutive RU is used to allocate a resource to the other 20 MHz bandwidth, the transmission bandwidth is 20 MHz. The distributed RU that carries the data field may be one RU, or may be a plurality of RUs. In addition, regardless of which distributed RU or distributed RUs in the transmission bandwidth is/are the distributed RU that carries the data field, a bandwidth occupied by the distributed RU is the transmission bandwidth.

According to the data transmission method provided in this application, when the distributed RU is used to carry the data field, the STF sequence is carried on all subcarriers in the transmission bandwidth or in the consecutive RUs corresponding to the distributed RU, instead of being carried only in the distributed RU. This can ensure increase of average power of a data part sent by the first communication apparatus, and ensure a relatively low PAPR of the first communication apparatus, thereby ensuring system performance.

In some embodiments, there are N first communication apparatuses, N≥1, the trigger frame includes a first field, the first field indicates spatial stream information allocated to the first communication apparatus when the first communication apparatus transmits data by using the distributed RU, and the spatial stream information includes a spatial stream start location and a number of spatial streams, where the spatial stream information of the first communication apparatus is determined by the second communication apparatus based on a total number of spatial streams that are in the transmission bandwidth and that are allocated to the N first communication apparatuses.

It should be noted that, in the conventional technology, because the data field is carried in the consecutive RUs, and the consecutive RUs do not overlap each other, the spatial stream information is the spatial stream start location and the number of spatial streams of the first communication apparatus that are determined after numbers of spatial streams of all users in the consecutive RUs are sorted. However, in this application, the data field is carried in the distributed RU, and consecutive RUs corresponding to distributed RUs of the users may overlap. To avoid mutual interference between STFs of the users in an overlapping area, in this application, the spatial stream start location and the number of spatial streams of the first communication apparatus are determined based on a total number of spatial streams in the transmission bandwidth.

In some embodiments, the STF sequence is obtained through spatial stream information-based cyclic shift.

It should be noted that, during actual application, there may be a plurality of first communication apparatuses, namely, a plurality of STAs, and the plurality of STAs send STF sequences in consecutive RUs corresponding to distributed RUs of the STAs. The consecutive RUs corresponding to the distributed RUs of the STAs may overlap. In this case, phase superposition and phase cancellation may occur in STFs sent by the STAs, that is, there is a relatively large correlation between the STFs sent by the STAs, resulting in inaccurate power measurement. To reduce correlation, the STF sequences sent by the STAs may be considered as STF sequences in different spatial streams. In addition, the spatial streams are numbered. Then, cyclic shift is performed on the STFs based on the numbers of the spatial streams. In this way, correlation between the spatial streams during transmission is reduced, so that accuracy of power measurement is improved.

In some embodiments, the processing unit 1402 is configured to: determine, based on the spatial stream information, F CSD values corresponding to F spatial streams of the first communication apparatus, where F≥1; and determine, based on a CSD value corresponding to an $i^{th}$ spatial stream, an STF sequence corresponding to the $i^{th}$ spatial stream, where i is greater than or equal to 1 and less than or equal to F.

It should be noted that the number of spatial streams allocated to the first communication apparatus corresponds to a quantity of CSD values. The STF sequences corresponding to the spatial streams are determined based on the CSD values corresponding to different spatial streams, so that correlation between the spatial streams can be reduced.

In some embodiments, the first field may include a first sub-field and a second sub-field. The first sub-field indicates the spatial stream start location allocated by the second communication apparatus to the first communication apparatus. The second sub-field indicates the number of spatial streams allocated by the second communication apparatus to the first communication apparatus.

In some embodiments, the first sub-field may be a starting spatial stream field in the trigger frame. The second sub-field may be a number of spatial streams field in the trigger frame.

In some embodiments, the processing unit 1402 is configured to: determine a device number of the first communication apparatus based on the trigger frame; determine a non-zero subcarrier index based on the device number; and determine the STF sequence of the first communication apparatus based on the non-zero subcarrier index.

It should be noted that, to avoid mutual interference between the STF sequences sent by the first communication apparatuses when the first communication apparatuses carry data fields by using the distributed RUs, different STF sequences may be determined for non-zero subcarrier indexes of different first communication apparatuses. A non-zero subcarrier may be understood as a subcarrier whose sequence value is not 0 in an RU corresponding to a distributed RU.

In some embodiments, the device number of the first communication apparatus is determined by calculating receiving time of a (user information list) User Info List field, receiving time of a (user information field) User Info Field field, and a length of the User Info Field field in the trigger frame.

It should be noted that the device number of the first communication apparatus is determined based on the receiving time of the User Info List field, the receiving time of the User Info Field field, and the length of the User Info Field field in the trigger frame without increasing indication overheads.

In an embodiment, Device number of the first communication apparatus=(Receiving time of the User Info Field field−Receiving time of the User Info List field in the trigger frame)/Length of the User Info Field field+1.

In addition, if B55 in a Common Field field in the trigger frame is 0, it indicates that the $1^{st}$ User Info Field in the User Info List is an extension of the Common Field, which is referred to as whether there is a special user information field Special User Info Field. In this case, Device number N of the first communication apparatus=(Receiving time of the User Info Field field−Receiving time of the User Info List field in the trigger frame)/Length of the User Info Field field. In other words, when B55=0, the Special User Info Field is used as an extension of the Common Field, and one User Info Field is actually not allocated to the user. Therefore, an actual device number N' of the first communication apparatus is the sequence number N of the User Info Field minus 1, that is, N'=N−1. When B55 is equal to 1, the device number N of the first communication apparatus is equal to the sequence number of the User Info Field.

In some embodiments, the number of spatial streams allocated to the first communication apparatus is less than or equal to 8. The first communication apparatus may indicate the device number of the first communication apparatus by using a first bit and a second bit in the trigger frame, where the first bit and the second bit are in the User Info List field in the trigger frame.

It should be noted that, the first bit may be 1 bit in a reserved field of the User Info List field in the trigger frame, and the second bit may be 1 bit in a Starting Spatial Stream field in the User Info List field. If the reserved field indicates the device number of the first communication apparatus, the field is not referred to as a reserved field.

In some embodiments, a periodicity of the STF sequence is 0.8 microseconds μs, the transmission bandwidth supports the N first communication apparatuses to transmit data, $1<N\leq 4$, an offset value of a non-zero subcarrier index corresponding to a first communication apparatus whose device number is j is a multiple of 16/K, $K=2^l$, $1\leq j\leq N$, and l is 1 or 2.

In some embodiments, N is 4. An offset value of a non-zero subcarrier index corresponding to a first communication apparatus whose device number is 1 is 0; an offset value of a non-zero subcarrier index corresponding to a first communication apparatus whose device number is 2 is 4; an offset value of a non-zero subcarrier index corresponding to a first communication apparatus whose device number is 3 is 8; and an offset value of a non-zero subcarrier index corresponding to a first communication apparatus whose device number is 4 is 12.

In some embodiments, a periodicity of the STF sequence is 1.6 μs, the transmission bandwidth supports the N first communication apparatuses to transmit data, $1<N\leq 4$, an offset value of a non-zero subcarrier index corresponding to a first communication apparatus whose device number is j is a multiple of 8/K, $K=2^l$, $1\leq j\leq N$, and l is 1 or 2.

In some embodiments, N is 4. An offset value of a non-zero subcarrier index corresponding to a first communication apparatus whose device number is 1 is 0; an offset value of a non-zero subcarrier index corresponding to a first communication apparatus whose device number is 2 is 2; an offset value of a non-zero subcarrier index corresponding to a first communication apparatus whose device number is 3 is 4; and an offset value of a non-zero subcarrier index corresponding to a first communication apparatus whose device number is 4 is 6.

In some embodiments, the trigger frame further includes a second field, and the second field indicates whether the first communication apparatus transmits data by using the distributed RU.

In this application, the second field in the trigger frame indicates whether to transmit data by using the distributed RU, to determine, based on the field, how to send the PPDU.

In some embodiments, the second field may be a sub-field in the (common information) Common Field field in the trigger frame. The sub-field in the Common Field field may be a reserved field in a Common Field field in a trigger frame in the conventional technology, or may be another field. This is not limited in this application.

Figure 15:
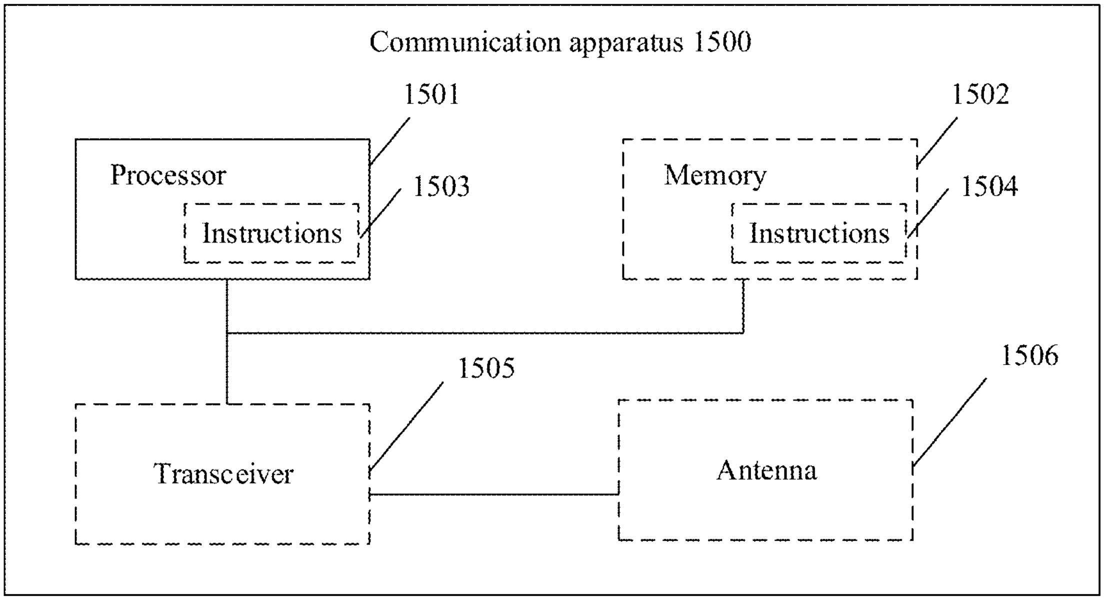
FIG. 15 is a schematic structural diagram of a communication apparatus according to an embodiment of this application.

In addition, FIG. 15 is a schematic structural diagram of a communication apparatus according to an embodiment of this application. As shown in FIG. 15, the communication apparatus 1500 may include a processor 1501 and a transceiver 1505, and may further include a memory 1502. The communication apparatus may be used as an apparatus for sending a trigger frame and a PPDU in this application, or may be used as an apparatus for receiving a trigger frame and a PPDU in this application.

The transceiver 1505 may be referred to as a transceiver unit, a transceiver machine, a transceiver circuit, or the like, and is configured to implement a transceiver function. The transceiver 1505 may include a receiver and a transmitter. The receiver may be referred to as a receiving machine, a receiver circuit, or the like, and is configured to implement a receiving function. The transmitter may be referred to as a transmitting machine, a transmitter circuit, or the like, and is configured to implement a sending function.

The memory 1502 may store a computer program, software code, or instructions 1504, where the computer program, the software code, or the instructions 1504 may also be referred to as firmware. The processor 1501 may control a MAC layer and a PHY layer by running a computer program, software code, or instructions 1503 in the processor 1501, or by invoking the computer program, the software code, or the instructions 1504 stored in the memory 1502, to implement a PPDU transmission method provided in the following embodiments of this application. The processor 1501 may be a central processing unit (CPU), and the memory 1502 may be, for example, a read-only memory (ROM) or a random access memory (RAM).

The processor 1501 and the transceiver 1505 that are described in this application may be implemented on an integrated circuit (IC), an analog IC, a radio frequency integrated circuit RFIC, a mixed-signal IC, an application-specific integrated circuit (ASIC), a printed circuit board (PCB), an electronic device, or the like.

The communication apparatus 1500 may further include an antenna 1506. The modules included in the communication apparatus 1500 are merely examples for description, and are not limited in this application.

As described above, the communication apparatus 1500 described in the foregoing embodiment may be an AP or a STA. However, the scope of the communication apparatus described in this application is not limited thereto, and a structure of the communication apparatus may not be limited to the structure in FIG. 15.

The communication apparatus in this application may alternatively be an independent device or may be a part of a relatively large device. For example, the communication apparatus may be implemented in the following form:

(1) an independent integrated circuit IC, a chip, a chip system, or a subsystem; (2) a set including one or more ICs, where the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 16:
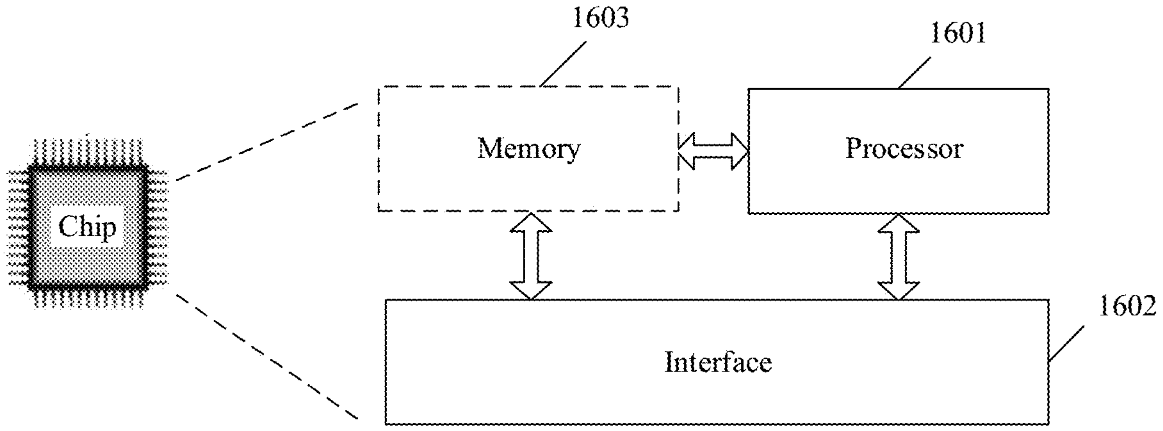
FIG. 16 is a schematic structural diagram of a communication apparatus according to an embodiment of this application.

For the communication apparatus implemented in the form of the chip or the chip system, refer to a schematic structural diagram of a chip shown in FIG. 16. The chip shown in FIG. 16 includes a processor 1601 and an interface 1602. There may be one or more processors 1601, and there may be a plurality of interfaces 1602. The interface 1602 is configured to input and output a signal. In some embodiments, the chip or the chip system may include a memory 1603. The memory 1603 is configured to store program instructions and data for the chip or the chip system.

It should be noted that, when an implementation form of the communication apparatus is a chip or a chip system, the transceiver unit may be correspondingly understood as an interface.

Embodiments of this application do not limit the protection scope and applicability of the claims. A person skilled in the art may adaptively change functions and deployments of elements in this application, or omit, replace, or add various processes or components as appropriate without departing from the scope of embodiments of this application.

Based on the foregoing embodiments, an embodiment of this application further provides a readable storage medium. The readable storage medium stores instructions. When the instructions are executed, the method performed in any one of the foregoing embodiments is implemented. The readable storage medium may include any medium that can store program code, such as a USB flash drive, a removable hard disk, a read-only memory, a random access memory, a magnetic disk, or an optical disc.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by the computer or the processor of the another programmable data processing apparatus generate an apparatus for implementing a function in one or more processes in the flowcharts and/or in one or more blocks in the block diagrams.

These computer program instructions may alternatively be stored in a computer-readable memory that can instruct a computer or another programmable data processing apparatus to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing apparatus, so that a series of operations and operations are performed on the computer or the another programmable apparatus, to generate computer-implemented processing. Therefore, the instructions executed on the computer or the another programmable apparatus provide operations for implementing a function in one or more processes in the flowcharts and/or in one or more blocks in the block diagrams.

What is claimed is:

1. A data transmission method, comprising:

receiving, by a first communication apparatus, a trigger frame from a second communication apparatus, wherein the trigger frame is used to trigger at least one first communication apparatus comprising the first communication apparatus to transmit an uplink physical layer protocol data unit (PPDU); and sending the PPDU to the second communication apparatus based on the trigger frame, wherein the PPDU comprises a data field and a short training field (STF) sequence;

the data field is carried in a distributed resource unit (RU) comprising a plurality of subcarrier groups that are discrete in frequency domain;

one of the subcarrier groups comprises one subcarrier or comprises at least two consecutive subcarriers;

the STF sequence is carried on all subcarriers in a first transmission bandwidth, and the first transmission bandwidth is a bandwidth corresponding to the distributed RU.

2. The method according to claim 1, wherein there are N first communication apparatuses, $N \geq 1$, the trigger frame comprises a first field that indicates spatial stream information allocated to the first communication apparatus when the first communication apparatus transmits data using the distributed RU, and the spatial stream information comprises a spatial stream start location and a number of spatial streams; and the spatial stream information of the first communication apparatus is determined by the second communication apparatus based on a total number of spatial streams in a transmission bandwidth and are allocated to the N first communication apparatuses.

3. The method according to claim 1, wherein the STF sequence is obtained through a spatial stream information-based cyclic shift.

4. The method according to claim 1, further comprising:

determining a device number of the first communication apparatus based on the trigger frame;

determining a non-zero subcarrier index based on the device number; and determining the STF sequence of the first communication apparatus based on the non-zero subcarrier index.

5. The method according to claim 4, further comprising:

determining the device number of the first communication apparatus by calculating a receiving time of a user information list field, a receiving time of a user information field, and a length of the user information field in the trigger frame.

6. The method according to claim 4, wherein a number of spatial streams allocated to the first communication apparatus is less than or equal to 8, the method further comprising:

indicating the device number of the first communication apparatus using a first bit and a second bit in the trigger frame, wherein the first bit and the second bit are in a user information list field in the trigger frame.

7. The method according to claim 4, wherein a periodicity of the STF sequence is 0.8 microseconds (μs), a transmission bandwidth supports N first communication apparatuses to transmit data, $1<N\leq 4$, and an offset value of the non-zero subcarrier index corresponding to the first communication apparatus whose device number is j is a multiple of 16/K, $K=2^l$, $1\leq j\leq N$, and l is 1 or 2.

8. The method according to claim 4, wherein a periodicity of the STF sequence is 1.6 microseconds (μs), a transmission bandwidth supports N first communication apparatuses to transmit data, $1<N\leq 4$, and an offset value of the non-zero subcarrier index corresponding to the first communication apparatus whose device number is j is a multiple of 8/K, $K=2^l$, $1\leq j\leq N$, and l is 1 or 2.

9. The method according to claim 1, wherein the trigger frame further comprises a second field that indicates whether the first communication apparatus transmits data by using the distributed RU.

10. The method according to claim 9, wherein the second field is a sub-field in a common information field in the trigger frame.

11. A data transmission apparatus, comprising:

a processor; and a memory to store instructions that, when executed by the processor, cause the apparatus to:

receive a trigger frame from a second communication apparatus, wherein the trigger frame is used to trigger at least one first communication apparatus comprising the data transmission apparatus to transmit an uplink physical layer protocol data unit (PPDU); and send the PPDU to the second communication apparatus based on the trigger frame, wherein the PPDU comprises a data field and a short training field (STF) sequence;

the data field is carried in a distributed resource unit (RU) comprising a plurality of subcarrier groups that are discrete in frequency domain;

one of the subcarrier groups comprises one subcarrier or comprises at least two consecutive subcarriers;

the STF sequence is carried on all subcarriers in a first transmission bandwidth, and the first transmission bandwidth is a bandwidth corresponding to the distributed RU.

12. The apparatus according to claim 11, wherein there are N first communication apparatuses, $N\geq 1$, the trigger frame comprises a first field that indicates spatial stream information allocated to the first communication apparatus when the first communication apparatus transmits data using the distributed RU, and the spatial stream information comprises a spatial stream start location and a number of spatial streams; and the spatial stream information of the first communication apparatus is determined by the second communication apparatus based on a total number of spatial streams in a transmission bandwidth and are allocated to the N first communication apparatuses.

13. The apparatus according to claim 11, wherein the STF sequence is obtained through a spatial stream information-based cyclic shift.

14. The apparatus according to claim 11, wherein when the instructions are executed by the processor, cause the apparatus further to:

determine a device number of the first communication apparatus based on the trigger frame;

determine a non-zero subcarrier index based on the device number; and determine the STF sequence of the first communication apparatus based on the non-zero subcarrier index.

15. The apparatus according to claim 14, wherein when the instructions are executed by the processor, cause the apparatus to:

determine the device number of the first communication apparatus by calculating receiving time of a user information list field, receiving time of a user information field, and a length of the user information field in the trigger frame.

16. The apparatus according to claim 14, wherein a number of spatial streams allocated to the first communication apparatus is less than or equal to 8, and when the instructions are executed by the processor, cause the apparatus to:

indicate the device number of the first communication apparatus by using a first bit and a second bit in the trigger frame, wherein the first bit and the second bit are in a user information list field in the trigger frame.

17. The apparatus according to claim 14, wherein a periodicity of the STF sequence is 0.8 microseconds (μs), a transmission bandwidth supports N first communication apparatuses to transmit data, $1<N\leq 4$, and an offset value of the non-zero subcarrier index corresponding to the first communication apparatus whose device number is j is a multiple of 16/K, $K=2^l$, $1\leq j\leq N$, and l is 1 or 2.

18. The apparatus according to claim 14, wherein a periodicity of the STF sequence is 1.6 microseconds (μs), a transmission bandwidth supports N first communication apparatuses to transmit data, $1<N\leq 4$, and an offset value of the non-zero subcarrier index corresponding to the first communication apparatus whose device number is j is a multiple of 8/K, $K=2^l$, $1\leq j\leq N$, and l is 1 or 2.

19. The apparatus according to claim 11, wherein the trigger frame further comprises a second field that indicates whether the first communication apparatus transmits data using the distributed RU.

20. The apparatus according to claim 19, wherein the second field is a sub-field in a common information field in the trigger frame.

* * * * *